United States Patent
Yoon et al.

(10) Patent No.: US 10,063,802 B2
(45) Date of Patent: Aug. 28, 2018

(54) MULTIMEDIA DEVICE AND METHOD FOR CONTROLLING EXTERNAL DEVICES OF THE SAME

(71) Applicant: LG ELECTRONICS INC., Seoul (KR)

(72) Inventors: Heewan Yoon, Seoul (KR); Jungmin Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/256,448

(22) Filed: Apr. 18, 2014

(65) Prior Publication Data

US 2015/0067729 A1 Mar. 5, 2015

(30) Foreign Application Priority Data

Aug. 28, 2013 (KR) .................... 10-2013-0102344
Aug. 28, 2013 (KR) .................... 10-2013-0102345

(51) Int. Cl.
*H04N 5/445* (2011.01)
*H04N 5/44* (2011.01)
(Continued)

(52) U.S. Cl.
CPC ....... *H04N 5/44582* (2013.01); *G06F 3/0482* (2013.01); *H04N 5/4403* (2013.01); *H04N 5/44543* (2013.01); *H04N 21/42222* (2013.01); *H04N 21/431* (2013.01); *H04N 21/43615* (2013.01); *H04N 21/4438* (2013.01); *H04N 21/482* (2013.01); *H04N 2005/44556* (2013.01); *H04N 2005/44578* (2013.01)

(58) Field of Classification Search
CPC .......... H04N 21/42222; H04N 21/485; H04N 5/44582; H04N 5/4403; H04N 5/44543; G06F 3/017; G06F 3/0346
See application file for complete search history.

(56) References Cited

U.S. PATENT DOCUMENTS

2002/0049978 A1* 4/2002 Rodriguez ............ G06F 3/0486
725/86
2004/0041723 A1 3/2004 Shibamiya et al. .......... 341/176
(Continued)

FOREIGN PATENT DOCUMENTS

EP 1 175 087 A2 1/2002
WO WO 2010/002997 A1 1/2010

OTHER PUBLICATIONS

European Search Report dated Sep. 29, 2014 issued in Application No. 14 001 455.6.

*Primary Examiner* — Alexander Q Huerta
(74) *Attorney, Agent, or Firm* — KED & Associates, LLP

(57) ABSTRACT

A multimedia device and a method for controlling the same are disclosed. The multimedia device connected with an external device according to one embodiment of the present invention comprises an external device interface module connecting the external device with the multimedia device; a network interface module performing communication with the external device through a network; a display module displaying video data and first GUI data, which are received from the external device through the external device interface module; a user interface module receiving a control signal output from a remote controller; and a controller.

6 Claims, 32 Drawing Sheets

(51) Int. Cl.
*H04N 21/422* (2011.01)
*G06F 3/0482* (2013.01)
*H04N 21/482* (2011.01)
*H04N 21/431* (2011.01)
*H04N 21/436* (2011.01)
*H04N 21/443* (2011.01)

(56) References Cited

U.S. PATENT DOCUMENTS

| | | | | |
|---|---|---|---|---|
| 2009/0066647 | A1* | 3/2009 | Kerr | G06F 3/0346 345/158 |
| 2011/0055865 | A1* | 3/2011 | Jung | H04N 5/4403 725/38 |
| 2011/0265119 | A1* | 10/2011 | Jeong | G06F 3/0486 725/38 |
| 2012/0019732 | A1* | 1/2012 | Lee | G06F 17/30274 348/732 |
| 2012/0062457 | A1* | 3/2012 | Lee | G06F 3/0346 345/157 |
| 2012/0124615 | A1* | 5/2012 | Lee | H04N 21/25875 725/30 |
| 2012/0274852 | A1* | 11/2012 | Jung | G06F 9/4443 348/564 |
| 2013/0080916 | A1* | 3/2013 | Lopez | H04N 5/445 715/753 |
| 2013/0088332 | A1* | 4/2013 | Park | H04N 21/4126 340/10.1 |
| 2014/0009394 | A1* | 1/2014 | Lee | H04N 5/4403 345/157 |
| 2016/0323626 | A1* | 11/2016 | Kim | G08C 17/02 |

* cited by examiner

FIG. 15
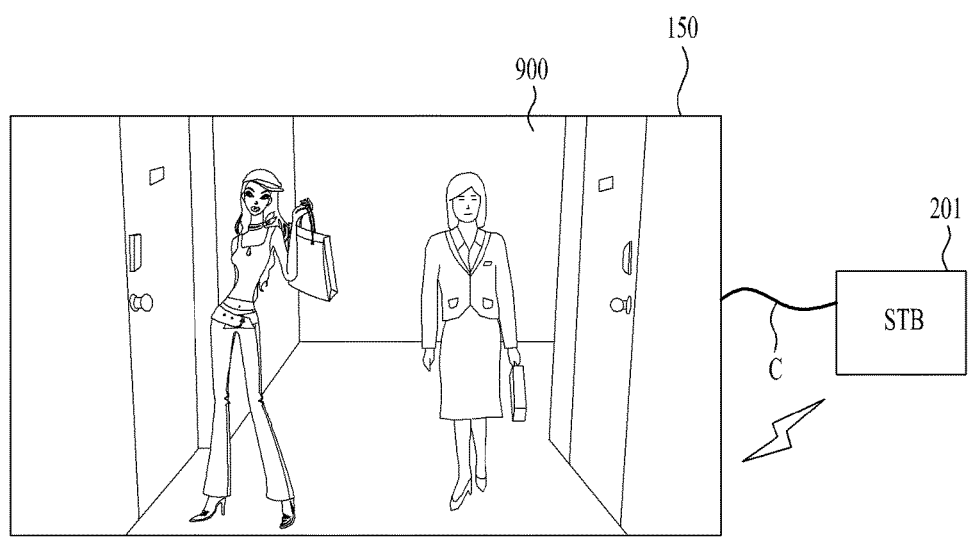
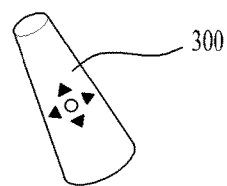

MULTIMEDIA DEVICE AND METHOD FOR CONTROLLING EXTERNAL DEVICES OF THE SAME

CROSS-REFERENCE TO RELATED APPLICATIONS

This application claims the benefit of the Korean Patent Application Nos. 10-2013-0102344 and 10-2013-0102345 filed on Aug. 28, 2013, respectively which is hereby incorporated by reference as if fully set forth herein.

BACKGROUND OF THE INVENTION

Field of the Invention

The present specification relates to a multimedia device and a method for controlling the same, and more particularly, to a technique for controlling a multimedia device and an external device connected with the multimedia device by using one remote controller.

Discussion of the Related Art

In accordance with development the electronic technology, various kinds of electronic devices have been increasingly developed and popularized. The latest electronic devices have a function for receiving a signal of a remote controller for user convenience. As a result, it is possible for users to control various kinds of electronic devices, such as a television (TV), an audio player, a digital versatile disc (DVD) player, a set-top box (STB), a Blu-ray disc (BD) player, and a home theater system (HTS), by using a remote controller.

Meanwhile, a recently developed multimedia device (for example, a TV) has a function for receiving various kinds of information in a state that the multimedia device is connected to a network, such as Internet. In order to control the multimedia device and electronic devices (for example, STB, BD player, HTS, etc.) connected to the multimedia device, a problem occurs in that a number of remote controllers equivalent to the number of the devices are required.

In order to solve the problem, many discussions on the technology in controlling a plurality of devices using a single remote controller have been made. However, such discussions of the related art still have a problem in that a control mode of the remote controller should be changed whenever various kinds of electronic devices are controlled, and the control mode of the remote controller should be set through several depths.

SUMMARY OF THE INVENTION

Accordingly, the present specification is directed to a multimedia device and a method for controlling the same, which substantially obviate one or more problems due to limitations and disadvantages of the related art.

An object of the present specification is to provide a multimedia device and a method for controlling the same, in which a remote controller is automatically set by a control mode of a corresponding external device, which is to be controlled, through entrance to an external input mode of the external device.

Another object of the present specification is to provide a multimedia device and a method for controlling the same, in which a protocol for setting a remote controller in accordance with a control mode of a corresponding external device is provided.

Still another object of the present specification is to provide a multimedia device and a method for controlling the same, in which a control authority of a remote controller is automatically changed in accordance with a status of the multimedia device.

Further still another object of the present specification is to provide a multimedia device and a method for controlling the same, in which a control authority of a remote controller is allocated to the multimedia device and an external device in accordance with a condition of a user input signal.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a multimedia device connected with an external device according to one embodiment of the present invention comprises an external device interface module connecting the external device with the multimedia device; a network interface module performing communication with the external device through a network; a display module displaying video data and first GUI data, which are received from the external device through the external device interface module; a user interface module receiving a control signal output from a remote controller; and a controller, wherein the controller processes the control signal output from the remote controller in the multimedia device if second GUI data on the multimedia device are displayed on the display module together with at least one of the video data and the first GUI data, and transmits the control signal output from the remote controller to the external device through the network interface module if the second GUI data on the multimedia device are not displayed on the display module.

In another aspect of the present invention, a multimedia device connected with an external device comprises an external device interface module connecting the external device with the multimedia device; a network interface module performing communication with the external device through a network; a display module displaying video data and first GUI data, which are received from the external device through the external device interface module, and second GUI data on the multimedia device; a user interface module receiving a control signal output from a remote controller; and a controller, wherein the controller transmits the control signal output from the remote controller to the external device through the network interface module if the control signal output from the remote controller corresponds to a first function of the remote controller, and processes the control signal output from the remote controller in the multimedia device to control the second GUI data if the control signal output from the remote controller corresponds to a second function of the remote controller.

In other aspect of the present invention, a multimedia device connected with at least two external devices comprises an external device interface module connecting each of a first external device and a second external device with the multimedia device; a network interface module performing communication with the first external device and the second external device through a network; a display module displaying video data and first GUI data, which are received from the first external device through the external device interface module; a user interface module receiving a control signal output from a remote controller, the control signal including a signal corresponding to motion of the remote controller and a signal corresponding to a key button provided in the remote controller; and a controller controlling the network interface module to transmit the control signal output from the remote controller to the first external device, wherein the controller controls the display module to display second GUI data together with at least one of the video data and the first GUI data if the second GUI data are received from the second external device through the external device interface module in a state that at least one of the video data and the first GUI data is displayed, and controls the network interface module to transmit the control signal output from the remote controller to the second external device.

According to one embodiment of the present invention, there is provided a solution for setting a remote controller automatically in accordance with a control mode of a corresponding external device, which is to be controlled, through entrance to an external input mode of the external device.

Also, according to another embodiment of the present invention, a protocol for setting a remote controller in accordance with a control mode of a corresponding external device is provided.

Also, according to still another embodiment of the present invention, a solution for changing a control authority of a remote controller automatically in accordance with a status of the multimedia device is provided.

Also, according to further still another embodiment of the present invention, a solution for allocating a control authority of a remote controller to the multimedia device and the external device in accordance with a condition of a user input signal is provided.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 15 is a diagram illustrating an example of a method for controlling a specific external device in a multimedia device through an HDMI-CEC function;

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

The suffixes "module" and "unit" for the elements used in the following description are given or used in common by considering facilitation in writing this disclosure only but fail to have meanings or roles discriminated from each other. The "module" and "unit" may be used together.

In the meantime, a multimedia device described in this specification corresponds to an intelligent network TV that additionally provides a computer support function in addition to a broadcasting receiving function. Accordingly, the multimedia device may be provided with a more convenient interface such as a manual input unit, a touch screen, or a spatial remote controller. Also, the multimedia device enables e-mailing, web browsing, banking or games by accessing Internet or computer in accordance with the support of wire or wireless Internet function. For these various functions, a standardized general-purpose operating system (OS) may be used.

Moreover, since the multimedia device described in the present invention may freely be provided with or delete various applications on a general-purpose OS kernel, the multimedia device may perform user-friendly various functions.

Moreover, the embodiments of the present invention will now be described in detail with reference to the accompanying drawings and the disclosure illustrated in the accompanying drawings. However, it is to be understood that the present invention is not limited to or restricted by the following embodiments.

Although the terms used in the present invention are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
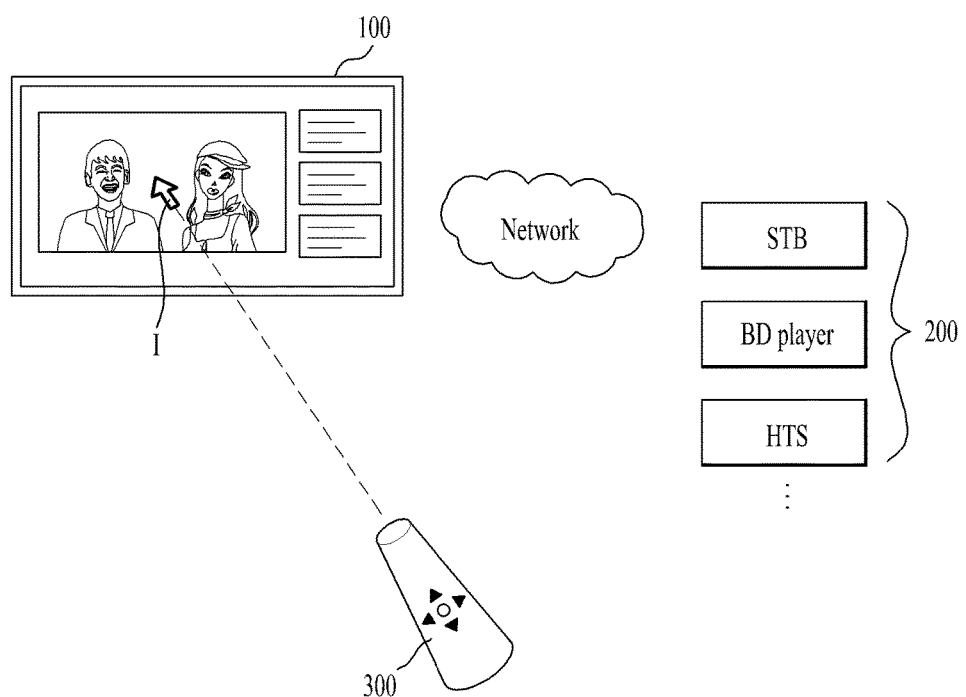
FIG. 1 is a brief diagram illustrating a system that includes a multimedia device controlled by a remote controller and an external device connected with the multimedia device in accordance with one embodiment of the present invention.

FIG. 1 is a brief diagram illustrating a system that includes a multimedia device controlled by a remote controller and an external device connected with the multimedia device in accordance with one embodiment of the present invention.

As shown in FIG. 1, a remote controller 300 according to one embodiment of the present invention may control a multimedia device 100 and an external device 200 connected with the multimedia device 100. A plurality of external devices 200 may exist.

The multimedia device 100 is an intelligent network TV that additionally provides a computer support function in addition to a broadcasting receiving function. Examples of the multimedia device 100 include a network TV, a smart TV, a hybrid broadcast broadband television (HBBTV), an Internet TV, a web TV, and an Internet protocol television (IPTV).

The external device 200 may be connected with the multimedia device 100 through a wire cable and/or wire/wireless network. The external device 200 may be connected with the multimedia device 100 through a wire cable and at the same time may be connected with the multimedia device 100 through wire/wireless network.

Examples of the external device 200 controlled by the remote controller 300 include, but not limited to, a set-top box (STB), a blu-ray disc (BD) player, and a home theater system (HTS).

An indicator I corresponding to motion of the remote controller 300 is displayed on a screen of the multimedia device 100.

A user may control the multimedia device 100 and the external device 200 by using the remote controller 300. For example, if the multimedia device 100 enters an external input mode of the STB, the user may control the STB by using the remote controller 300. If the multimedia device 100 enters an external input mode of the BD player, the user may control the BD player by using the remote controller 300. If the multimedia device 100 enters an external input mode of the HTS, the user may control the HTS by using the remote controller 300.

A method for enabling a user to control the multimedia device 100 and the external device 200 will be described in detail with reference to the respective drawings.

Figure 2:
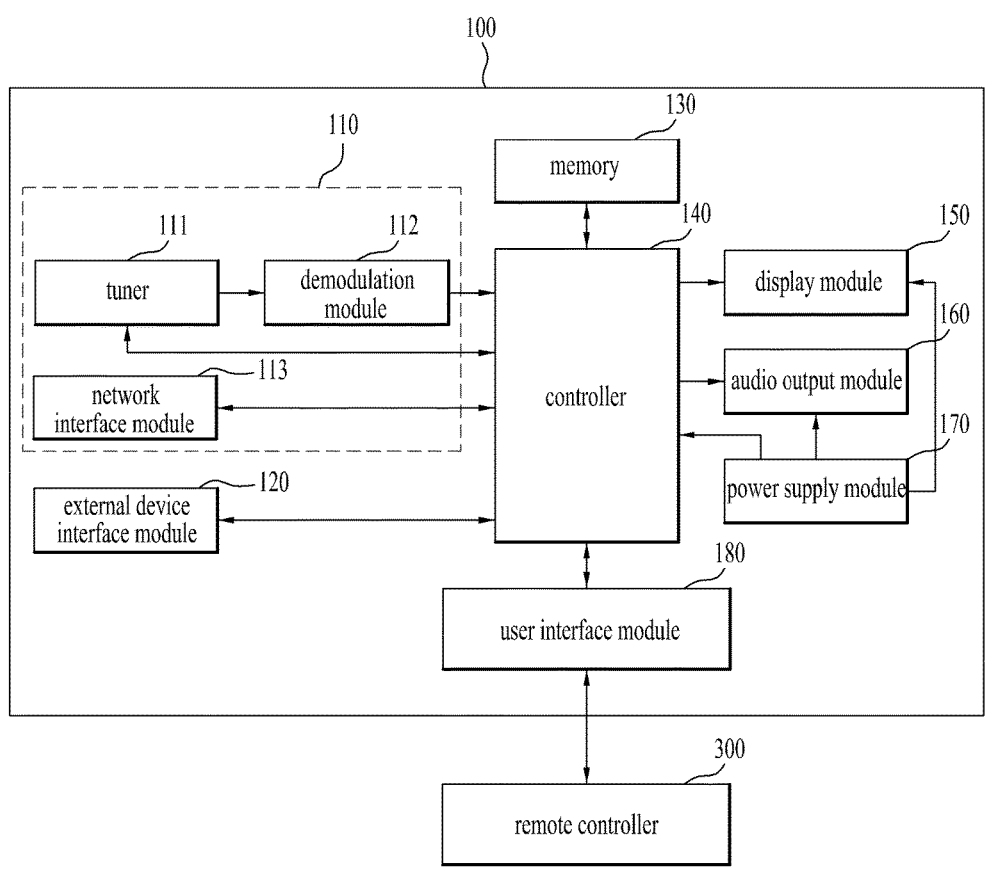
FIG. 2 is a block diagram illustrating modules of a multimedia device according to one embodiment of the present invention.

FIG. 2 is a block diagram illustrating modules of a multimedia device according to one embodiment of the present invention. FIG. 2 relates to the embodiment for convenience of description, and the multimedia device may include modules other than the modules shown in FIG. 2 and some modules may be omitted within the scope of the present invention.

As shown in FIG. 2, the multimedia device 100 according to one embodiment of the present invention includes a receiving module 110, an external device interface module 120, a memory 130, a controller 140, a display module 150, an audio output module 160, a power supply module 170, and a user interface module 180.

The receiving module 110 may include a tuner 111, a demodulation module 112, and a network interface module 113. A plurality of tuners 111 may be provided as the case may be.

The tuner 110 may receive RF broadcast signal of a single carrier based on an advanced television system committee (ATSC) mode or RF broadcast signal of multiple carriers based on a digital video broadcasting (DVB) mode.

The demodulation module 112 receives the digital IF (DIF) signal converted by the tuner 110 and demodulates the received digital IF signal.

For example, if the digital IF signal output from the tuner 110 is based on the ATSC mode, the demodulation module 112 performs 8-vestigal side band (8-VSB) demodulation, for example. Also, the demodulation module 112 may perform channel decoding.

The network interface module 113 provides an interface for connecting the multimedia device 100 with wire/wireless networks including Internet network. The network interface module 113 may include an Ethernet terminal, for example, for wire network connection. For example, Wireless LAN (WLAN) (Wi-Fi), Wireless broadband (Wibro), World Interoperability for Microwave Access (Wimax), High Speed Downlink Packet Access (HSDPA) may be used by the network interface module 113 for the wireless network connection.

The network interface module 113 may transmit or receive data to or from another user or other electronic device through a network connected thereto or another network linked to the connected network.

The external device interface module 120 is an interface that enables data communication between the external device and the multimedia device 100. The external device interface module 120 may be connected to the external device such as Digital Versatile Disk (DVD), Blu-ray, game device, camera, camcorder, computer (e.g., notebook computer), STB etc. through wire/wireless cables. The external device 200 may be connected with the multimedia device 100 by the wire/wireless through the external device interface module 120. The external device interface module 120 transmits a video, audio, or data signal externally input through the external device connected thereto, to the controller 140. Also, the external device interface module 120 may output the video, audio or data signal processed by the controller 140 to the external device.

The external device interface module 120 may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., for example. The HDMI is an interface that forwards digital type video and audio signals to one cable at the same time. If both a player and an output device have HDMI terminal, the player and the output device may transmit and receive a video signal and an audio signals simply by connecting one HDMI cable therebetween.

The memory 130 may store a program for processing and controlling each signal of the controller 140, or may store the processed video, audio or data signal therein. Also, the memory 130 may temporarily store the video, audio or data signal input from the external device interface module 120 or the network interface module 113. The memory 130 stores various OS, middleware and platforms, for example, therein.

The user interface module 180 forwards the signal input by the user to the controller 140 or transmits the signal from the controller 140 to the external device (for example, remote controller 300). For example, the user interface module 180 may be designed to receive and process a control signal such as power on/off, channel selection and screen setup from the remote controller 300 in accordance with various communication modes such as RF (radio frequency) communication mode and IR communication mode, or to transmit the control signal from the controller 140 to the remote controller 300.

The controller 140 controls each module within the multimedia device 100.

The controller 140 demultiplexes input streams through the tuner 111, the demodulator 112, the network interface module 113 or the external device interface module 120, or processes the demultiplexed signals to generate and output a signal for a video and audio output. The controller 140 will be described later in more detail with reference to FIG. 3.

The display module 150 converts the video signal, the data signal, OSD signal, which are processed by the controller 140, or the video signal, the data signal, etc., which are received from the external device interface module 120, to R, G, B signals, respectively, thereby generating a driving signal. Examples of the display module 150 include PDP, LCD, OLED, flexible display, and 3D display.

The audio output module 160 outputs the signals audio-processed by the controller 140, for example, stereo signal, 3.1 channel signal or 5.1 channel signal, as audio. Various types of speakers may be used as the audio output module 160.

The power supply module 170 supplies the corresponding power to the whole portion of the multimedia device 100. In particular, the power supply module 170 may supply the power to the controller 140 that may be implemented in the form of a system on chip (SOC), the display module 150 for image display, and the audio output module 160 for audio output.

Figure 3:
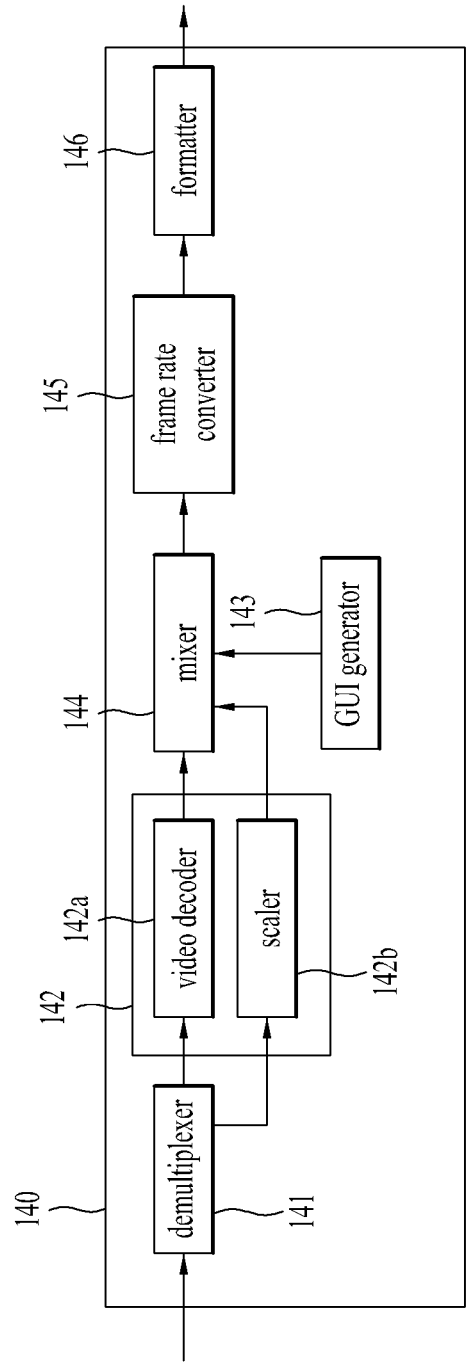
FIG. 3 is a detailed block diagram illustrating a controller of a multimedia device shown in FIG. 2.

FIG. 3 is a detailed block diagram illustrating the controller shown in FIG. 2.

As shown in FIG. 3, the controller 140 of the multimedia device 100 includes a demultiplexer 141, a video processor 142, a GUI generator 143, a mixer 144, a frame rate converter 145, and a formatter 146. Also, the controller 140 may be designed to further include an audio processor (not shown) and a data processor (not shown) within the scope of the present invention.

The demultiplexer 141 demultipelxes input streams. For example, if MPEG-2 TS is input, the demultiplexer 141 may demultiplex the MPEG-2 TS and split the demultiplexed MPEG-2 TS into a video signal, an audio signal and a data signal.

The video processor 142 may process the demultiplexed video signal. To this end, the video processor 142 may include a video decoder 142a and a scaler 142b. The video decoder 142a decodes the demultiplexed video signal, and the scaler 142b performs scaling to output resolution of the decoded video signal through the video output module. The video signal decoded by the video processor 142 is input to the mixer 144.

The GUI generator 143 generates a GUI signal in accordance with a user input or by itself. Accordingly, the mixer 144 may mix the GUI signal generated by the GUI generator 143 with the decoded video signal processed by the video processor 142. The GUI generator 143 includes an on screen display (OSD) generator that generates an OSD signal including environment configuration information of the multimedia device 100.

The mixed signal is provided to the formatter 146. As the decoded broadcast video signal or the external input signal is mixed with the GUI signal or the OSD signal, the GUI or OSD may be overlaid on the broadcast video or the external input video.

The frame rate converter (FRC) 145 may convert a frame rate of the input video. For example, the frame rate converter 145 converts a frame rate of 60 Hz to a frame rate of 120 Hz or 240 Hz. If the frame rate converter 145 converts the frame rate of 60 Hz to the frame rate of 120 Hz, a first frame may be inserted between another first frame and the second frame, or a third frame predicted from the first frame and the second frame may be inserted between the first frame and the second frame. If the frame rate converter 145 converts the frame rate of 60 Hz to the frame rate of 240 Hz, three same frames may be inserted between the first frame and the second frame, or the third frame predicted from the first frame and the second frame may be inserted between the first frame and the second frame. In the meantime, the input frame rate may be maintained without separate conversion.

The formatter 146 receives an output signal converted by the frame rate converter 145, changes a format of the signal to conform to the video output module, and then outputs the changed format. For example, the formatter 146 may output R, G, B data signals. The R, G, B data signals may be output as low voltage differential signaling (LVDS) or mini-LVDS.

The modules of the multimedia device 100 will be described as follows in connection with the embodiment of the present invention.

The external device interface module 120 is connected with the external device 200, which is to be controlled through the multimedia device 100 by using the remote controller 300, through the wire/wireless.

The network interface module 113 may transmit or receive data to and from an external server (not shown) or the external device 200 through the wire/wireless network.

The network interface module 113 may receive a control application on the external device 200 from the external server, and the memory 130 may store the received control application therein. The control application may mean an application required when a heterogeneous external device is to be controlled through the multimedia device 100. The controller 140 may control the network interface module 113 to receive an update file for updating the control application previously stored in the memory, periodically or in accordance with a command of the user.

The user interface module 180 receives a user input signal and then forwards the received user input signal to the controller 140. The user interface module 180 may include a communication module for receiving RF signal or IR signal from the remote controller 300, and a sensor module for sensing voice or gesture of the user.

If the user inputs a user command by using the remote controller 300, the user interface module 180 receives the user input signal from the remote controller 300 in accordance with RF communication mode or IR communication mode.

Otherwise, if the user inputs the user command through a graphic user interface (GUI) displayed on the display module 150, the display module 150 serves as the user interface module 180, and the user input signal is received through the GUI.

Otherwise, if the user inputs the user command by uttering a specific voice or taking a specific gesture, the user input signal may be received through the sensor module within the user interface module 180.

If a command for entering an external input mode of a specific external device (for example, STB) 200 is received through the user interface module 180, the controller 140 searches for the external devices 200 connected with the multimedia device 100 through the same network, detects the STB of the searched external devices 200, and performs pairing with the detected STB. If the command for entering the external input mode of the STB is received, the controller 140 may access the control application previously stored in the memory 130 and implement the accessed control application to perform pairing with the STB.

If pairing with the specific external device 200 is completed, the user may control the specific external device 200 through the multimedia device 100 by using the remote controller 300.

If pairing with the specific external device 200 is completed, a method for controlling the specific external device 200 through the multimedia device 100 by using the remote controller 300 will be described as follows.

The external device interface module 120 receives video data and/or GUI data from the specific external device 200, and the controller 140 outputs the received video data and/or GUI data through the display module 150. The video data correspond to a content provided by the specific external device 200, and the GUI data correspond to functions that may be implemented by the specific external device 200. Since the GUI data are generated by the specific external device 200, the multimedia device 100 cannot know what the functions of the specific external device 200 corresponding to the GUI data are.

The user interface module 180 receives a signal corresponding to motion of the remote controller 300 and a signal corresponding to a key button provided in the remote controller 300 from the remote controller 300. If the user moves the remote controller only, the user interface module 180 receives only the signal corresponding to the motion from the remote controller 300. If the user pushes the key button provided in the remote controller 300 without moving the remote controller 300, the user interface module 180 receives key button related information only from the remote controller 300. If the user pushes a specific key button after moving the remote controller 300, the user interface module 180 first receives the signal corresponding to the motion from the remote controller 300 and then receives the signal corresponding to the specific key button.

The controller 140 calculates coordinate value information on the basis of the received signal corresponding to the motion. The coordinate value information means coordinate value information of the screen of the display module 150.

The network interface module 113 transmits a signal corresponding to the calculated coordinate value information to the specific external device 200.

If the network interface module 113 receives the signal corresponding to the key button from the remote controller 300, the network interface module 113 transmits the received signal corresponding to the key button to the specific external device 200. As the case may be, if the received signal corresponding to the key button is the form of data that cannot be processed by the specific external device 200, the controller 140 first process the received signal corresponding to the key button to the form of data that can be processed by the specific external device 200. The network interface module 113 may transmit the signal corresponding to the motion and/or the signal corresponding to the key button to the specific external device 200 through IP network.

For example, the signal corresponding to the motion of the remote controller 300 may be received in accordance with, but not limited to, the RF communication mode, and the signal corresponding to the key button provided in the remote controller 300 may be received in accordance with, but not limited to, the IR communication mode.

The specific external device 200 is designed to process the signal corresponding to the coordinate value information transmitted from the multimedia device 100. The specific external device 200 processes the signal corresponding to the coordinate value information transmitted from the multimedia device 100 and determines a portion on the video data and/or the GUI data to which the coordinate value information corresponds. The specific external device 200 implements a function corresponding to the coordinate value information, and transmits the implemented result to the multimedia device 100. For example, if only the signal corresponding to the coordinate value information is transmitted from the multimedia device 100, the specific external device 200 implements a function that highlights a menu option on the GUI data corresponding to the coordinate value information, and transmits the implemented result to the multimedia device 100. Alternatively, if the signal corresponding to the coordinate value information and the signal corresponding to the key button are transmitted from the multimedia device 100, the specific external device 200 implements a specific function corresponding to the menu option on the GUI data corresponding to the signal corresponding to the coordinate value information and the signal corresponding to the key button, and transmits the implemented result to the multimedia device 100.

However, as the case may be, even though pairing with the specific external device 200 is completed, the specific external device 200 connected with the multimedia device 100 may directly be controlled through HDMI-CEC function.

For example, if the specific external device 200 is connected with the multimedia device 100 through the HDMI terminal included in the external device interface module 120 and the external device interface module 120 supports the HDMI-CEC (high definition multimedia interface consumer electronics control) function, the specific external device 200 may directly control its basic functions by using the remote controller 300. The HDMI-CEC function means a function that may control mutually connected devices by using 13 pin of HDMI cable as a control line. For example, if the specific external device 200 is the STB, the multimedia device 100 may directly control the basic functions of the STB 200, such as play, pause, stop, fast wind, and rewind, by using the key button provided in the remote controller 300.

Alternatively, for example, if a signal for requesting a GUI for a screen remote controller is received from the remote controller 300, the multimedia device 100 may control the specific external device 200 by using the GUI output through the display module 150. In this case, the memory 130 of the multimedia device 100 previously stores IR code values mapped into each function of the specific external device 200. The GUI includes options corresponding to each function of the specific external device 200. If a selection command for selecting a specific option included in the GUI is received from the remote controller 300, the controller 140 detects IR code value mapped into a specific function, and the network interface module 113 transmits the detected IR code value to the remote controller 300. The remote controller 300 transmits IR signal corresponding to the transmitted IR code value to the specific external device 200. As a result, the specific external device 200 may be controlled.

The GUI for the screen remote controller is different from the GUI data transmitted from the specific external device 200 in that the multimedia device 100 may know what each function of the specific external device 200 corresponding to the GUI for the screen remote controller is but cannot know what each function of the specific external device 200 corresponding to the GUI data is. This is because that the GUI for the screen remote controller is generated from the controller 140 (for example, GUI generator) of the multimedia device 100 and the GUI data transmitted from the specific external device 200 are generated from the specific external device 200.

Figure 4:
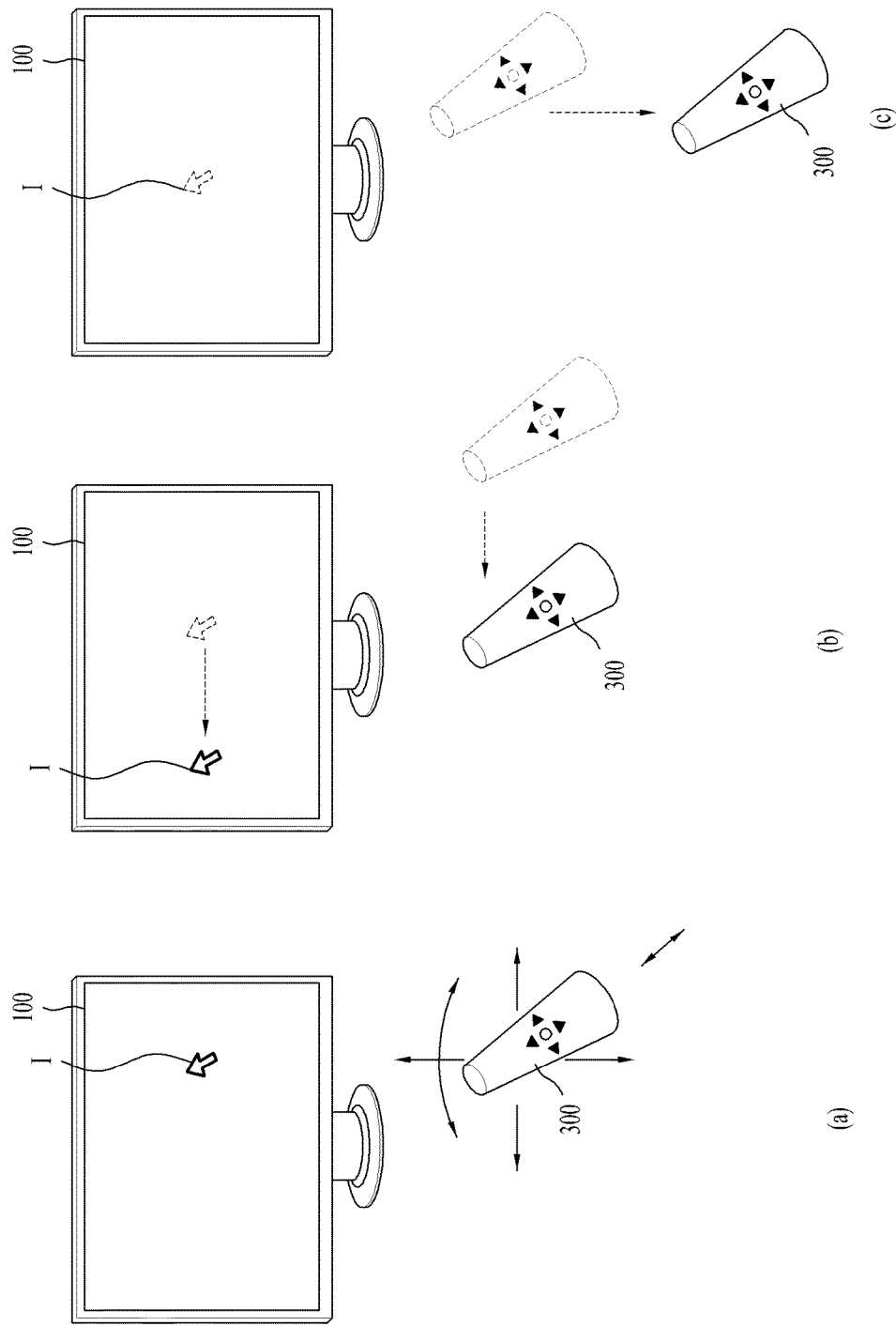
FIG. 4 is a brief diagram illustrating appearance of a remote controller according to one embodiment of the present invention.

FIG. 4 is a brief diagram illustrating appearance of a remote controller according to one embodiment of the present invention.

First of all, referring to (a) of FIG. 4, an indicator I corresponding to the remote controller 300 is displayed on the screen of the multimedia device 100.

The user may move or rotate the remote controller 300 in up and down direction, left and right direction ((b) of FIG. 4), and front and rear direction ((c) of FIG. 4). The indicator I displayed on the screen of the multimedia device 100 corresponds to motion of the remote controller 300. Since the remote controller 300 is displayed by motion of the corresponding indicator I based on 3D spatial motion, the remote controller 300 may be referred to as a spatial remote controller.

(b) of FIG. 4 illustrates that the indicator I displayed on the screen of the multimedia device 100 is moved to the left side correspondingly if the user moves the remote controller 300 to the left side.

The signal corresponding to the motion of the remote controller 300, which is sensed through the sensor of the remote controller 300, is transmitted to the multimedia device 100. The multimedia device 100 may calculate a coordinate of the indicator I from the signal corresponding to the motion of the remote controller 300. The multimedia device 100 may display the indicator I to correspond to the calculated coordinate.

(c) of FIG. 4 illustrates that the user moves the remote controller 300 to be away from the multimedia device 100 in a state that the user pushes a specific button within the remote controller 300. In this case, a selection area within the screen corresponding to the indicator I may be displayed by being enlarged through zoom-in. By contrast, if the user moves the remote controller 300 to be close to the multimedia device 100, the selection area within the screen corresponding to the indicator I may be displayed by being downsized through zoom-out. Meanwhile, if the remote controller 300 is to be away from the multimedia device 100, the selection area may be zoom-out. If the remote controller 300 is to be close to the multimedia device 100, the selection area may be zoom-in.

Figure 5:
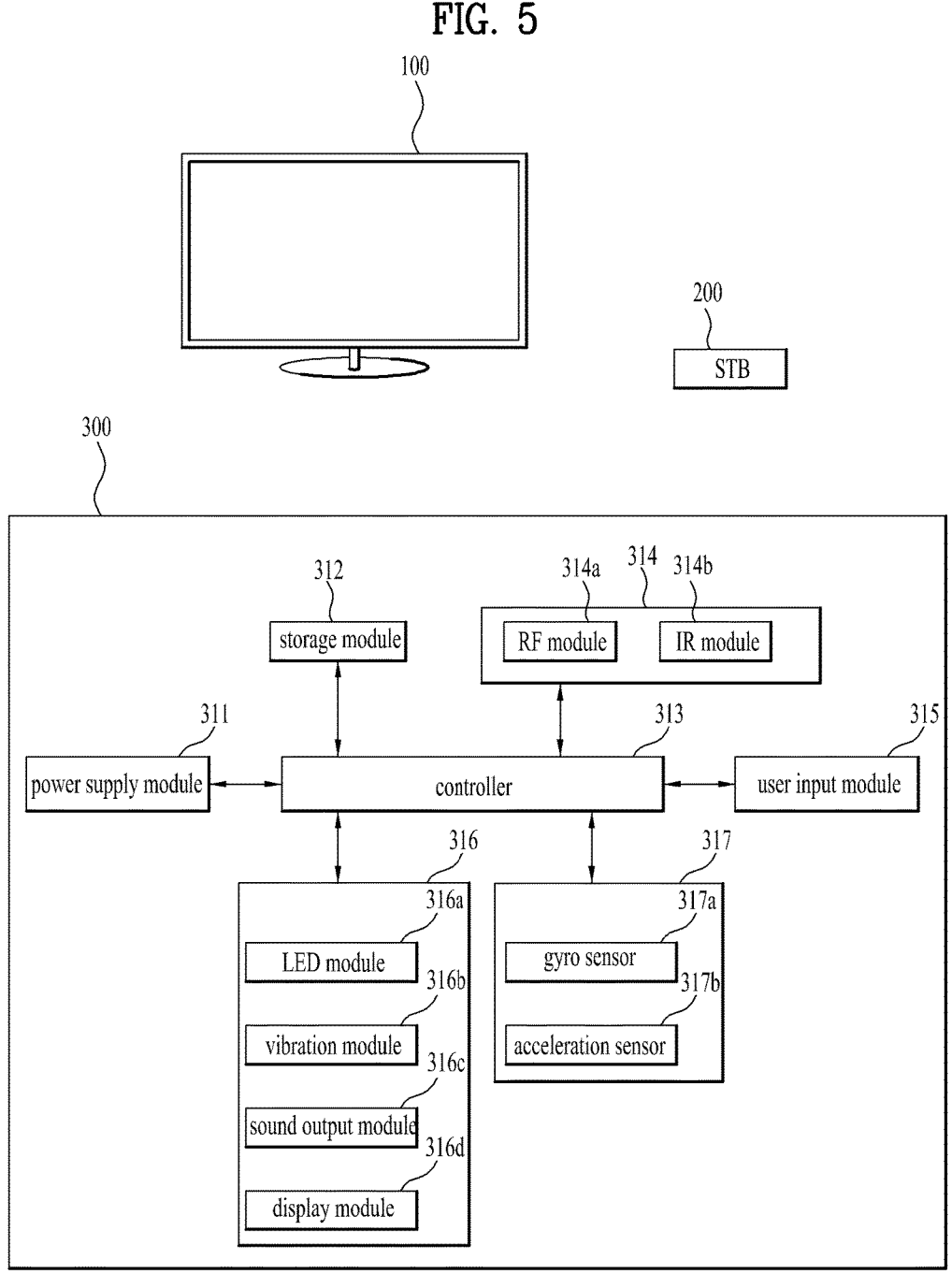
FIG. 5 is a detailed block diagram illustrating modules of the remote controller shown in FIG. 4.

FIG. 5 is a detailed block diagram illustrating modules of the remote controller shown in FIG. 4.

As shown in FIG. 5, the remote controller 300 includes a wireless communication module 314, a user input module 315, a sensor module 317, an output module 316, a power supply module 311, a storage module 312, and a controller 313.

The wireless communication module 314 is designed to enable communication with a random external device.

The remote controller 300 may include an RF module 314a that may transmit and receive a signal to and from the multimedia device 100 in accordance with the RF communication standard. Also, the remote controller 300 may include an IR module 314b that may transmit and receive a signal to and from the multimedia device 100 or the external device 200 (for example, STB) in accordance with the IR communication standard.

The remote controller 300 transmits a signal, which includes information on the motion of the remote controller 300, to the multimedia device 100 through the RF module 314a.

Also, the remote controller 300 may receive the signal, which has been transmitted from the multimedia device 100, through the RF module 314b. Also, the remote controller 300 may transmit a control signal for power on/off, channel change and volume change to the multimedia device 300 through the IR module 314b if necessary. Also, if the remote controller 300 controls the external device 200 through the GUI for the screen remote controller, the remote controller 300 may generate IR signal on the basis of the IR code value received from the multimedia device 100 through the RF module 314b and transmit the generated IR signal to the external device 200 through the IR module 314b.

The user input module 315 may include a keypad, a button, a touch pad, or a touch screen.

The sensor module 317 may include a gyro sensor 317a or an acceleration sensor 317b. The gyro sensor 317a may sense information on the movement of the remote controller 300. For example, the gyro sensor 317a may sense the information on the movement of the remote controller 300 on the basis of axes x, y and z. The acceleration sensor 317b may sense information on moving speed of the remote controller 300. Meanwhile, the sensor module 317 may further include a distance measurement sensor, and may sense a distance with the multimedia device 100 by using the distance measurement sensor.

The output module 316 may output a video or audio signal, which corresponds to manipulation of the user input module 315 or the signal transmitted from the multimedia device 300. For example, the output module may include an LED module 316a lighted when the user input module 315 is manipulated or if a signal is transmitted and received between the output module 316 and the multimedia device 100 through the wireless communication module 314, a vibration module 316b for generating vibration, a sound output module 316c for outputting a sound, or a display module 316d for outputting a video.

The power supply module 311 supplies the power to each element of the remote controller 300. The power supply module 311 may reduce power waste by stopping power supply if the remote controller 300 does not move for a predetermined time.

The storage module 312 may store various kinds of programs and application and data, which are required for control or operation of the remote controller 300. The controller 313 controls all the matters related to control of the remote controller 300. For example, the controller 313 may transmit a signal corresponding to a predetermined key manipulation of the user input module 315 or a signal corresponding to the movement of the remote controller 300 sensed by the sensor module 317 to the multimedia device 100 through the wireless communication module 314.

Hereinafter, the embodiments of the present invention will be described in detail with reference to the respective drawings.

According to one embodiment of the present invention, a control authority of the remote controller 100 may be switched from the multimedia device 100 to the external device 200 by only entrance to the external input mode of the external device 200 which is to be controlled. This will be described with reference to FIGS. 6 to 11.

Figure 6:
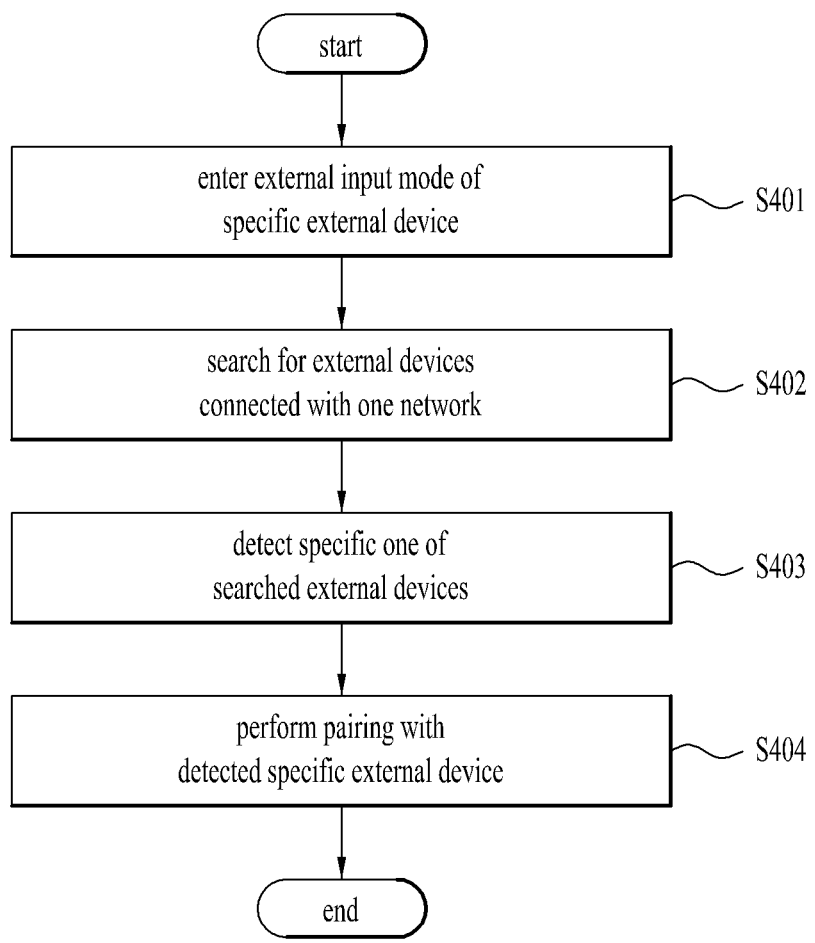
FIG. 6 is a flow chart illustrating an example of a method for controlling a multimedia device according to one embodiment of the present invention.

FIG. 6 is a flow chart illustrating an example of a method for controlling a multimedia device according to one embodiment of the present invention.

Referring to FIG. 6, entrance to the external input mode of the specific external device 200 is performed (S401). The user interface module 180 receives a command for entrance to the external input mode of the specific external device 200, and as a result, the controller 140 enters the external input mode of the specific external device 200. The controller 140 may output a screen indicating the external input mode of the specific external device 200 to the display module 150. For example, the screen may be a home screen transmitted from the specific external device 200.

The controller 140 searches for the external devices 200 connected with the multimedia device 100 through the same network (S402). For example, the controller 140 searches for the external devices 200 connected with the same access point as that of the network interface module 113. In this case, the controller 140 may be designed to implement a control application, which is previously stored, by accessing the memory 130 as overhead operation.

The controller 140 detects the specific external device 200 from the searched external devices 200 (S403). As the case may be, if two or more external devices 200, which are the same types as that of the specific external device 200, are searched, the controller 140 may recognize the external device 200 selected by a user command as the specific external device 200 which becomes a control target.

The controller 140 performs pairing with the detected specific external device 200 (S404). As the case may be, if two or more external devices 200, which are the same types as that of the specific external device 200, are searched, the controller 140 may try to perform pairing with the external device 200 selected by the user command. The procedure of pairing between the multimedia device 100 and the specific external device 200 will be described with reference to FIGS. 31 and 32.

If pairing with the specific external device 200 is completed, the control mode of the remote controller 300 is switched from the control mode of the multimedia device 100 to the control mode of the specific external device 200. Accordingly, use of the remote controller 300 is intended for control of the specific external device 200 not control of the multimedia device 100. However, as the case may be, information related to a specific key button provided in the remote controller 300 may be used to control the function of the multimedia device 100 without being transmitted to the specific external device 200. For example, if the user pushes a power on/off button or a button for displaying GUI for the multimedia device 100, among the key buttons provided in the remote controller 300, the key button related information may be used to control the corresponding function of the multimedia device 100 without being transmitted to the specific external device 200.

According to this embodiment, since the control authority of the remote controller 300 is automatically set to the control mode of the external device 200 by only entrance to the external input mode of the external device 200 which is to be controlled, user convenience is increased.

Figure 7:
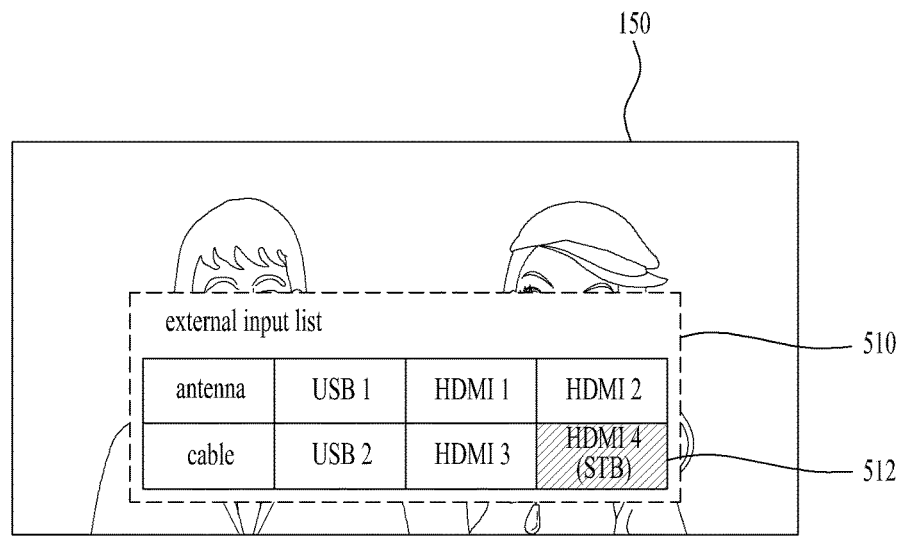
FIG. 7 is a diagram illustrating an example of a method for entering an external input mode of a specific external device in accordance with one embodiment of the present invention.

FIG. 7 is a diagram illustrating an example of a method for entering an external input mode of a specific external device in accordance with one embodiment of the present invention.

Referring to FIG. 7, a first GUI 510 is displayed on the display module 150 of the multimedia device 100. The first GUI 510 is displayed if the user selects a menu for entering the external input mode.

For example, if the user who is watching broadcasting through the multimedia device 100 pushes the key button provided in the remote controller 300 or a local key button provided in the multimedia device 100 to control the external device 200, the first GUI 510 may be displayed on the display module 150.

A list of the external devices connected through the external device interface module 120 is included in the first GUI 510. If an area 512 corresponding to the specific external device (for example, STB) within the first GUI 510 is selected using the remote controller 300, the remote controller 300 may enter the external input mode of the STB.

In the meantime, according to the present invention, the screen remote controller displayed on the screen of the display module 150 may enter the external input mode of the specific external device. This will be described with reference to FIG. 8.

Figure 8:
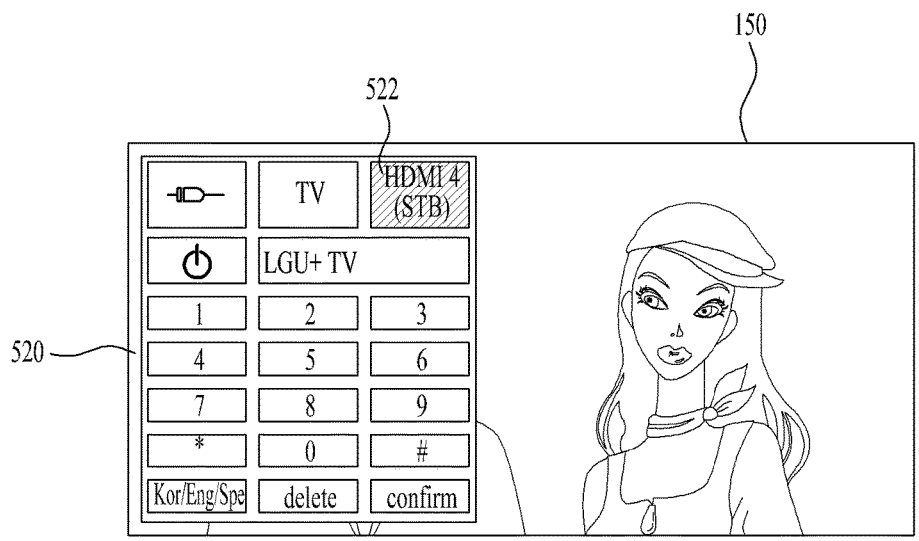
FIG. 8 is a diagram illustrating another example of a method for entering an external input mode of a specific external device in accordance with one embodiment of the present invention.

FIG. 8 is a diagram illustrating another example of a method for entering an external input mode of a specific external device in accordance with one embodiment of the present invention.

Referring to FIG. 8, a second GUI 520 is displayed on the display module 150 of the multimedia device 100.

For example, if the user who is watching broadcasting through the multimedia device 100 pushes the key button provided in the remote controller 300 or a local key button provided in the multimedia device 100 or selects a predetermined menu provided in the screen of the display module 150, so as to control the external device 200, the second GUI 520 may be displayed on the display module 150.

A key button (virtual key button) for controlling the functions of the multimedia device 100 and a key button (virtual key button) for entering to the external input mode of the external device 200 connected through the external device interface module 120 are included in the second GUI 520 corresponding to the screen remote controller. If a key button 522 for the specific external device (for example, STB) within the second GUI 520 is selected using the remote controller 300, the remote controller 300 may enter the external input mode of the STB.

In the meantime, according to the present invention, the remote controller may enter the external input mode of the specific external device through gesture recognition. This will be described with reference to FIG. 9.

Figure 9:
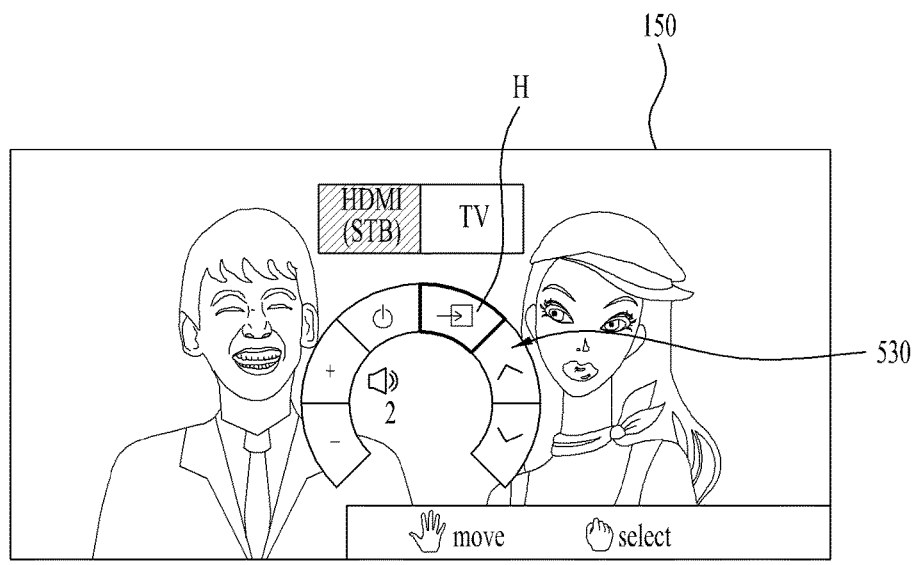
FIG. 9 is a diagram illustrating still another example of a method for entering an external input mode of a specific external device in accordance with one embodiment of the present invention.

FIG. 9 is a diagram illustrating still another example of a method for entering an external input mode of a specific external device in accordance with one embodiment of the present invention.

Referring to FIG. 9, a third GUI 530 is displayed on the display module 150 of the multimedia device 100.

For example, if the user who is watching broadcasting through the multimedia device 100 pushes the key button provided in the remote controller 300 or a local key button provided in the multimedia device 100 or takes a specific gesture, so as to control the external device 200, the third GUI 530 may be displayed on the display module 150.

A key button (virtual key button) for controlling the functions of the multimedia device 100 and a key button (virtual key button) for entering to the external input mode of the external device 200 connected through the external device interface module 120 are included in the third GUI 530. A key button corresponding to a function or menu which is currently selected, among key buttons provided in the third GUI 530, is highlighted (H). If the user moves his or her hand in a state that the user unfolds his or her palm, the key button which is highlighted is changed to correspond to motion of the hand. If the user grasps his or her hand in a state that the specific key button is highlighted, the function or menu corresponding to the specific key button is implemented. In this way, as the user takes a gesture, the controller may enter the external input mode of the specific external device (for example, STB).

Figure 10:
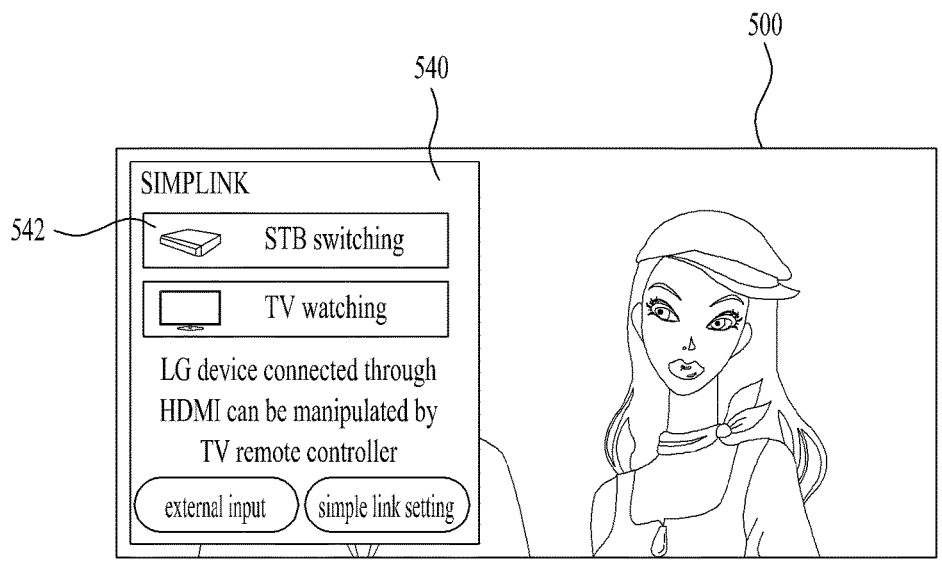
FIG. 10 is a diagram illustrating further still another example of a method for entering an external input mode of a specific external device in accordance with one embodiment of the present invention.

FIG. 10 is a diagram illustrating further still another example of a method for entering an external input mode of a specific external device in accordance with one embodiment of the present invention.

Referring to FIG. 10, a fourth GUI 540 is displayed on the display module 150 of the multimedia device 100.

For example, if the user who is watching broadcasting through the multimedia device 100 pushes the key button provided in the remote controller 300 or a local key button provided in the multimedia device 100 or selects a predetermined menu provided in the screen of the display module 150, so as to control the external device 200, the fourth GUI 540 may be displayed on the display module 150.

The fourth GUI 540 includes a list of external devices 200 that support HDMI-CEC function. If a button 542 for the specific external device (for example, STB) within the fourth GUI 540 is selected, the controller may enter the external input mode of the STB.

In the meantime, according to the present invention, after entering the external input mode of the specific external device 200, the controller searches for the external devices 200 connected with the multimedia device 100 through the same network. As a result, two or more external devices 200 which are the same types as the specific external device 200 may be detected. This will be described with reference to FIG. 11.

Figure 11:
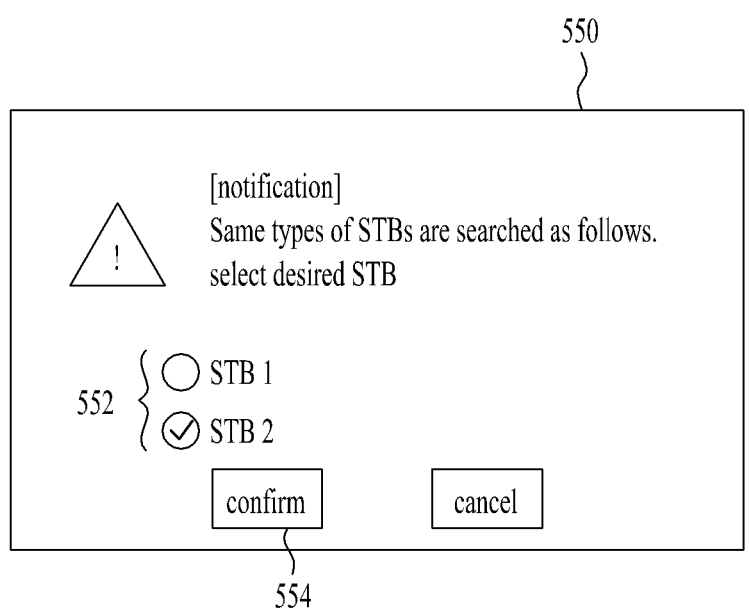
FIG. 11 is a diagram illustrating an example of a GUI displayed on a display module of a multimedia device in accordance with one embodiment of the present invention.

FIG. 11 is a diagram illustrating an example of a GUI displayed on a display module of a multimedia device in accordance with one embodiment of the present invention.

Referring to FIG. 11, a fifth GUI 550 is displayed on the display module 150 of the multimedia device 100. If the controller 140 enters the external input mode of the STB, the controller 140 searches for the external devices 200 connected with the multimedia device 100 through the same network. As a result, if two or more external devices 200 which are the same types as the specific external device 200, that is, STB are detected, the controller 140 controls the display module 150 to display the fifth GUI 550, thereby identifying which one of two STBS is the external device 200 to be controlled by the user.

In this case, the same type external devices 200 are the devices that perform a function similar to that of the specific external device 200 and mean the external devices that belong to the same product group as that of the specific external device 200. For example, the STB, the digital camera, the mobile terminal, the DVD player, the game console correspond to their respective product groups different from one another. As the case may be, the same type external devices 200 may mean the external devices that are manufactured by the same manufacturer and belong to the same product group. For example, when two STBs corresponding to the same product group exist, if their manufacturers are different from each other, the controller 140 may be designed to determine that these two STBs are not the same type external devices 200.

A list 552 of the same type external devices 200 as the specific external device 200 is listed in the fifth GUI 550. If the user selects STB 2 and a confirmation button 554 by using the remote controller 300, the controller 140 recognizes the STB 2 selected by the user command as the specific external device 200 which becomes a control target, that is, pairing target, and performs pairing with the STB 2. For example, the STB 1 and the STB 2 listed in the list 552 may be displayed to include a model name of each STB.

Hereinafter, a method for controlling the specific external device 200 through the multimedia device 100 by using the remote controller 300 if pairing with the specific external device 200 is completed will be described with reference to FIGS. 12 to 14.

Figure 12:
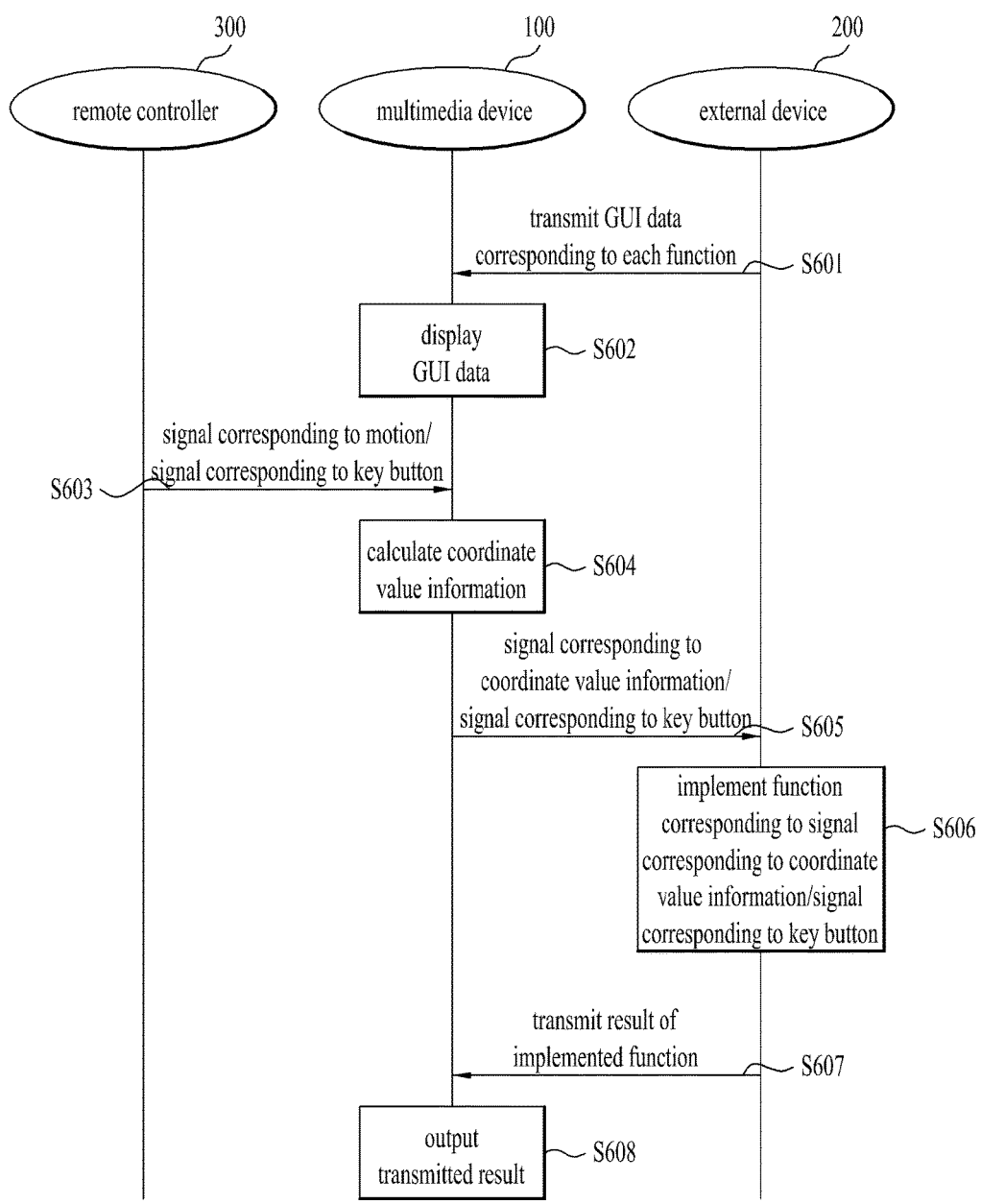
FIG. 12 is a flow chart illustrating an example of a method for controlling a specific external device through a multimedia device by using a remote controller in accordance with one embodiment of the present invention.

FIG. 12 is a flow chart illustrating an example of a method for controlling a specific external device through a multimedia device by using a remote controller in accordance with one embodiment of the present invention.

It is assumed that the multimedia device 100 enters the external input mode of the specific external device 200 and pairing between the multimedia device 100 and the specific external device 200 is completed.

The specific external device 200 transmits GUI data corresponding to functions, which may be implemented by the specific external device 200, to the multimedia device 100 (S601). The specific external device 200 may transmit video data to the multimedia device 100 in accordance with the embodiment. Also, the GUI data may include text data, graphic data and video data.

The multimedia device 100 receives the GUI data from the specific external device 200 and displays the received GUI data (S602). The GUI data are received from the external device interface module 120 of the multimedia device 100, and the received GUI data are displayed through the display module 150 under the control of the controller 140. The controller 140 of the multimedia device 100 cannot know what the GUI data are and what functions of the specific external device 200 correspond to the GUI data.

A case where the user pushes a selection key button after moving the remote controller 300 towards a second menu option included in the GUI data in a state that the user locates the remote controller 300 towards a first menu option included in the GUI data will be described as an example.

First of all, the user interface module 180 of the multimedia device 100 receives a signal corresponding to motion as a user input signal from the remote controller 300 (S603).

The controller 140 of the multimedia device calculates first coordinate value information on the basis of the received signal corresponding to motion (S604). It is assumed that the first coordinate value information corresponds to the first menu option.

The network interface module 113 of the multimedia device transmits the signal corresponding to the calculated first coordinate value information to the specific external device 200 (S605).

The specific external device 200 implements a function corresponding to the first coordinate value information by processing the signal corresponding to the first coordinate value information (S606). Since the user has not pushed the selection key button provided in the remote controller 300, the specific external device 200 may implement a function of highlighting the first menu option on the GUI data as a function corresponding to the first coordinate value information.

Also, the specific external device 200 transmits the highlighted result of the first menu option on the GUI data to the multimedia device 100 (S607).

The external device interface module 120 of the multimedia device 100 receives the result, and the controller 140 controls the display module 150 to display the GUI data with the highlighted first menu option (S608).

Also, the user interface module 180 of the multimedia device 100 receives the signal corresponding to motion as the user input signal from the remote controller 300 (S603).

The controller 140 of the multimedia device calculates second coordinate value information on the basis of the received signal corresponding to motion (S604). It is assumed that the second coordinate value information corresponds to the second menu option. Although the coordinate value information corresponding to the motion of the remote controller 300 may further exist between the first coordinate value information and the second coordinate value information, it is assumed that the controller 140 calculates the first coordinate value information and the second coordinate value information only.

The network interface module 113 of the multimedia device 100 transmits the signal corresponding to the calculated second coordinate value information to the specific external device 200 (S605).

The specific external device 200 implements a function corresponding to the second coordinate value information by processing the signal corresponding to the second coordinate value information (S606). Since the user has not pushed the selection key button provided in the remote controller 300, the specific external device 200 may implement a function of highlighting the second menu option on the GUI data as a function corresponding to the second coordinate value information.

Also, the specific external device 200 transmits the highlighted result of the second menu option not the first menu option on the GUI data to the multimedia device 100 (S607).

The external device interface module 120 of the multimedia device 100 receives the result, and the controller 140 controls the display module 150 to display the GUI data with the highlighted second menu option (S608).

Also, the user interface module 180 of the multimedia device 100 receives selection key button related information as the user input signal from the remote controller 300 (S603).

If the received selection key button related information is a type of data that cannot be processed by the specific external device 200, the controller 140 of the multimedia device 100 may process the received selection key button related information as the type of data that can be processed by the specific external device 200. If the received selection key button related information is a type of data that may be processed by the specific external device 200, the data processing procedure of the controller 140 may be omitted.

The network interface module 113 of the multimedia device transmits the selection key button related information to the specific external device 200 (S605).

The specific external device 200 implements a function corresponding to the key button related information by processing the transmitted selection key button related information (S606). In other words, the specific external device 200 implements a specific function corresponding to the second menu option on the GUI data.

And, the specific external device 200 transmits the implemented result of the specific function corresponding to the second menu option to the multimedia device 100 (S607).

The external device interface module 120 of the multimedia device 100 receives the result, and the controller 140 controls the display module 150 to output the implemented result of the specific function corresponding to the second menu option. For example, if the second menu option corresponds to an option for playing a specific VOD content, the external device interface module 120 receives audio/video data of the specific VOD content from the specific external device 200, and the controller 140 controls the audio output module 160 to output the audio data and controls the display module 150 to output the video data.

In accordance with the embodiment, the steps S603 to S608 may be performed a plurality of times, and some of the respective steps may be performed by being overlapped with one another temporally. Also, each of the steps S603 to S608 may be performed a plurality of times while the video data are being output through the display module 150 at the step S608, or some of the respective steps may be performed by being overlapped with one another temporally.

In the meantime, the specific external device 200 may transmit indicator P related information corresponding to the motion of the remote controller 300 to the multimedia device 100 on the basis of the signal corresponding to the coordinate value information transmitted from the multimedia device 100 (S607).

The external device interface module 120 of the multimedia device 100 receives the indicator P related information, and the controller 140 controls the display module 150 to display the indicator P on the basis of the received indicator P related information (S608). As a result, the indicator P may be output to the display module 150 of the multimedia device 100 to correspond to the motion of the remote controller 300.

Figure 13:
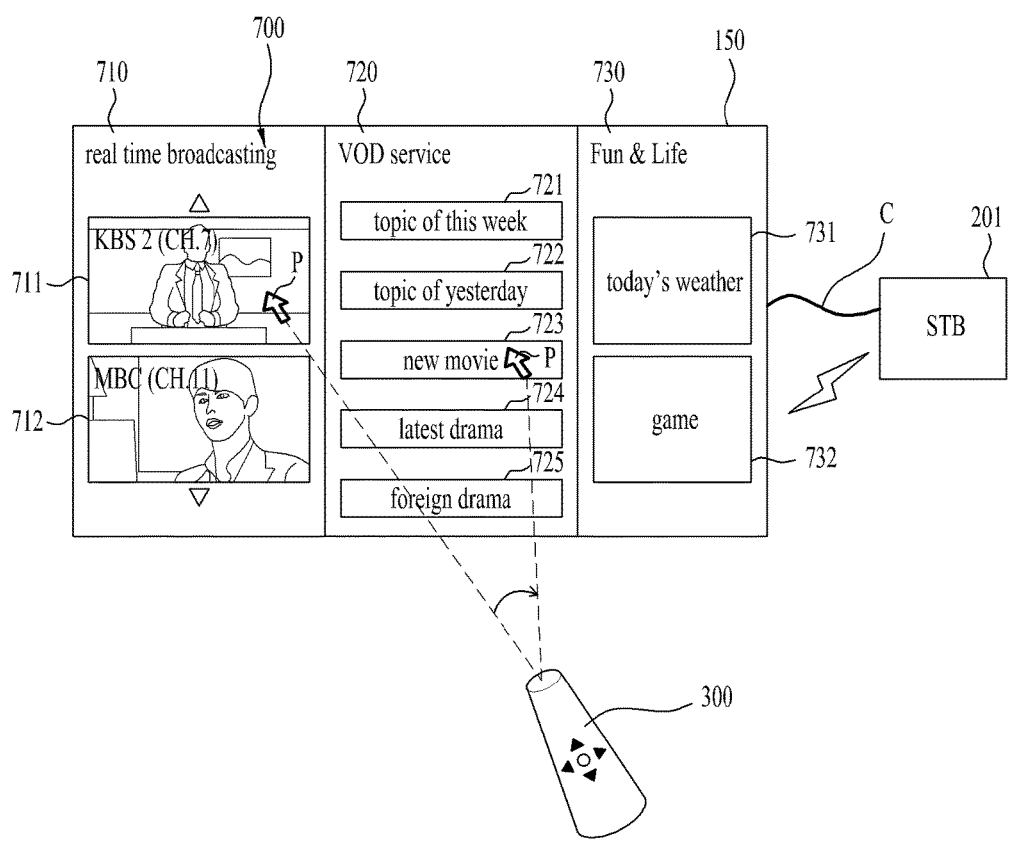
FIG. 13 is a diagram illustrating an example of GUI data displayed on a display module of a multimedia device in accordance with one embodiment of the present invention.

FIG. 13 is a diagram illustrating an example of GUI data displayed on a display module of a multimedia device in accordance with one embodiment of the present invention. In FIG. 13, it is assumed that the specific external device 200 to be controlled by the multimedia device 100 is the STB 201. For example, the STB 201 is connected with the external device interface module 120 through an HDMI cable C, and is accessed to, but not limited to, the same access point as that of the network interface module 113.

Referring to FIG. 13, GUI data 700 of the STB are displayed on the display module 150 of the multimedia device 100. The GUI data 700 of the STB are received by the external device interface module 120 of the multimedia device 100 from the STB 201.

The GUI data 700 of the STB may be transmitted from the STB 201 after pairing between the multimedia device 100 and the STB 201 is completed, or may be transmitted before pairing between the multimedia device 100 and the STB 201 is completed after entrance to the external input mode of the STB 201. However, it is hereinafter assumed that pairing between the multimedia device 100 and the STB 201 is completed if the multimedia device 100 intends to respective functions of the STB 201 corresponding to the GUI data of the STB by using the remote controller 300.

The GUI data 700 of the STB include menu options corresponding to the respective functions that may be implemented by the STB 201. For example, the GUI data 700 of the STB may include thumbnail images 711 to 712 for each channel as real time broadcasting 710, menus 721 to 725 representing a type of VOD content as a VOD service 720, and today's weather menu 731 and a game menu 732 as Fun & Life 730. However, the controller 140 of the multimedia device 100 cannot know what the GUI data of the STB are and what functions of the STB 201 correspond to the GUI data 700 of the STB.

If the user moves the remote controller 300 towards the GUI data 700 of the STB, the signal corresponding to the coordinate value information is transmitted from the multimedia device 100 to the STB 201 in accordance with the aforementioned description in respect of FIG. 12, and the indicator P related information corresponding to the motion of the remote controller 300 is transmitted from the STB 201 to the multimedia device 100. As a result, the indicator P corresponding to the motion of the remote controller 300 is displayed on the display module 150 of the multimedia device 100.

For example, if the user moves the indicator P corresponding to the motion of the remote controller 300 to a new movie menu 723 on the thumbnail image 711 of KBS1 channel, the signal corresponding to the coordinate value information is transmitted from the multimedia device 100 to the STB 201 in accordance with the aforementioned description in respect of FIG. 12, and the implemented result of the function corresponding to the coordinate value information is transmitted from the STB 201 to the multimedia device 100. As a result, the thumbnail image 711 of the KBS1 channel may be highlighted on the display module 150 of the multimedia device 100 and then the highlighted state of the thumbnail image 711 of the KBS1 channel may be released and the highlighted result of the new movie menu 723 may be output in due order.

For another example, if the user pushes a selection key button after locating the indicator P corresponding to the motion of the remote controller 300 on the thumbnail image 711 of the KBS1 channel, in accordance with the aforementioned description in respect of FIG. 12, the thumbnail image 711 of the KBS1 channel is highlighted and live broadcasting data of the KBS1 channel are output through the display module 150 and the audio output module 160 after entrance to a broadcasting view menu of the KBS1 channel.

In the meantime, according to the present invention, the indicator corresponding to the motion of the remote controller 300 may be displayed on the display module 150 differently before and after pairing between the multimedia device 100 and the specific external device 200 is completed. This will be described with reference to FIG. 14.

Figure 14:
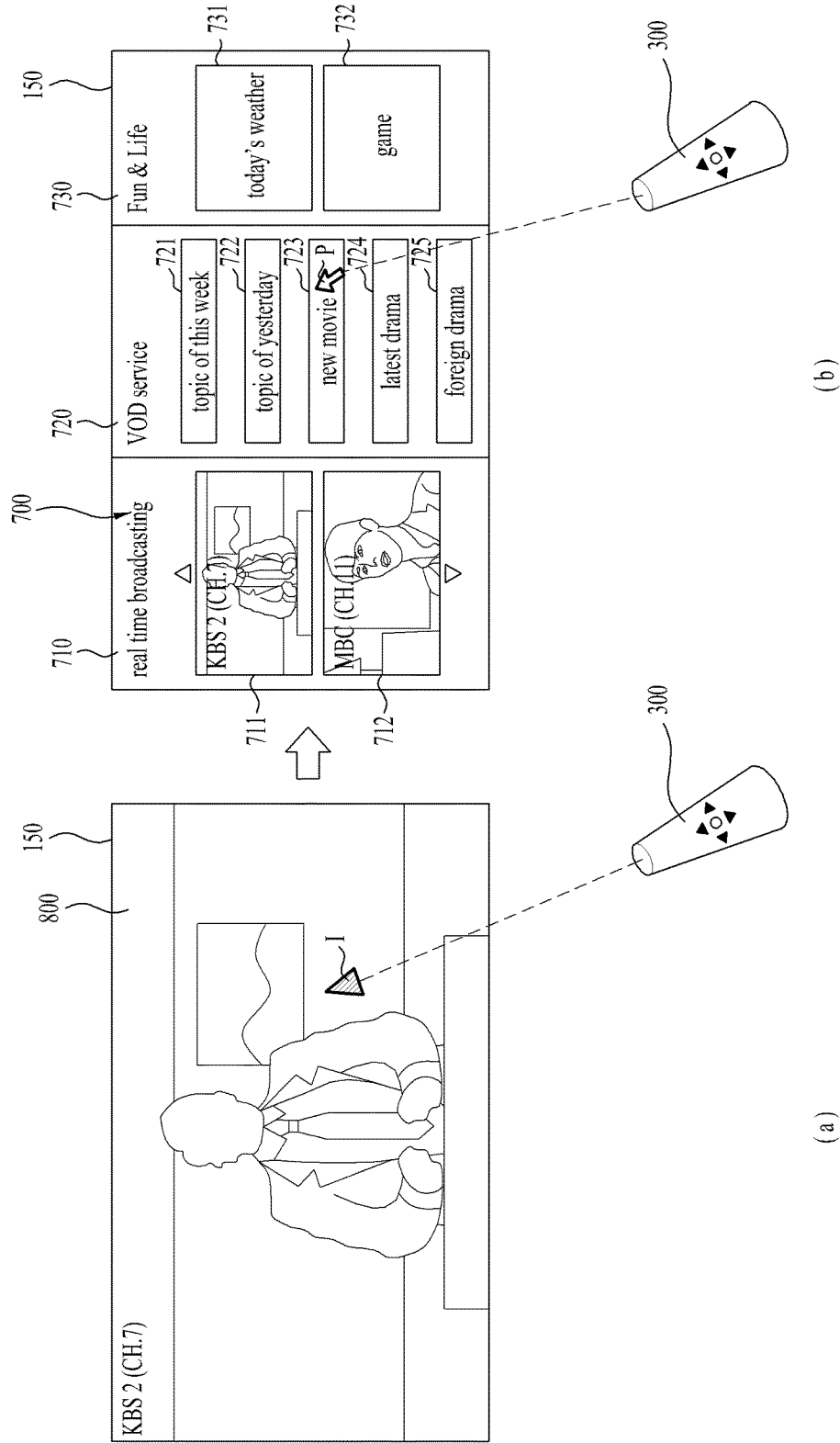
FIG. 14 is a diagram illustrating variation of an indicator displayed on a display module of a multimedia device before and after pairing of a specific external device is completed.

FIG. 14 is a diagram illustrating variation of an indicator displayed on a display module of a multimedia device before and after pairing of a specific external device is completed.

Referring to (a) of FIG. 14, video data 800 of a live broadcasting signal are output to the display module 150 of the multimedia device 100. An indicator I corresponding to the motion of the remote controller 300 is displayed on the screen of the display module 150. The indicator I will be referred to as a first indicator I. The controller 140 controls the display module 150 to calculate coordinate value information on the basis of the signal corresponding to motion, which is received from the remote controller and output the first indicator I in accordance with the calculated coordinate value information. The first indicator I is intended to control the function of the multimedia device 100 or the GUI related to the multimedia device 100.

If a command for entering the external input mode of the STB 201 is received while the user is watching live broadcasting, the controller 140 of the multimedia device 100 performs pairing with the STB 201 as described with reference to FIG. 6.

If pairing between the multimedia device 100 and the STB 201 is completed, the controller 140 controls the network interface module 113 to transmit the signal corresponding to motion, which is received from the remote controller, to the STB 201.

The STB 201 transmits indicator P related information corresponding to the motion of the remote controller 300 to the multimedia device 100 on the basis of the signal corresponding to the coordinate value information transmitted from the multimedia device 100. The external device interface module 120 receives the indicator P related information, and the controller 140 controls the display module 150 to display the indicator P shown in (b) of FIG. 14 on the basis of the received indicator P related information. The indicator P will be referred to as a second indicator P. In other words, the second indicator P is intended to control the STB 201 in accordance with the signal corresponding to the motion of the remote controller 300.

According to comparison between (a) and (b) of FIG. 14, the first indicator I and the second indicator P may set at least one of shape, size, color and transparency differently from each other. The user may recognize whether the remote controller 300 is currently in the control mode of the multimedia device 100 or the control mode of the specific external device 200, on the basis of variation of the indicator output to the display module 150. Meanwhile, as the case may be, even though pairing between the multimedia device 100 and the specific external device 200 is completed, the user may directly control the specific external device 200 connected with the multimedia device 100 through the HDMI-CEC function. This will be described with reference to FIG. 15.

FIG. 15 is a diagram illustrating an example of a method for controlling a specific external device in a multimedia device through an HDMI-CEC function. In FIG. 15, it is assumed that the specific external device 200 to be controlled by the multimedia device 100 is the STB 201. For example, although the STB 201 is connected with the external device interface module 120 through the HDMI cable C, the STB 201 is not limited to the example of FIG. 15.

Referring to FIG. 15, video data 900 of a VOD content are output to the display module 150 of the multimedia device 100. The video data 900 are transmitted from the STB 201 to the multimedia device 100 through the HDMI cable C.

If the multimedia device 100 and the STB 201 support the HDMI-CEC function, the user may directly basis functions of the STB 201 by using the remote controller 300. For example, the user may directly control basis functions of the STB 201, such as play and pause of VOD content, by pushing the key button, such as play and pause, which is provided in the remote controller 300.

In the meantime, if GUI data of the STB, which are received from the specific external device 200, are only displayed on the display module, the controller 140 may determine that the remote controller 300 is set to the control mode of the specific external device 200. However, if GUI data of the multimedia device 100 are displayed on the display module 150 together with the GUI data received from the specific external device 200, a problem as to whether the multimedia device 100 or the specific external device 200 should be controlled using the remote controller 300 occurs.

Hereinafter, if the GUI data of the multimedia device 100 are displayed on the display module 150 together with the GUI data received from the specific external device 200, a first method for controlling the multimedia device 100 and the specific external device 200 by using the remote controller 300 will be described in detail with reference to FIGS. 16 to 19.

Figure 16:
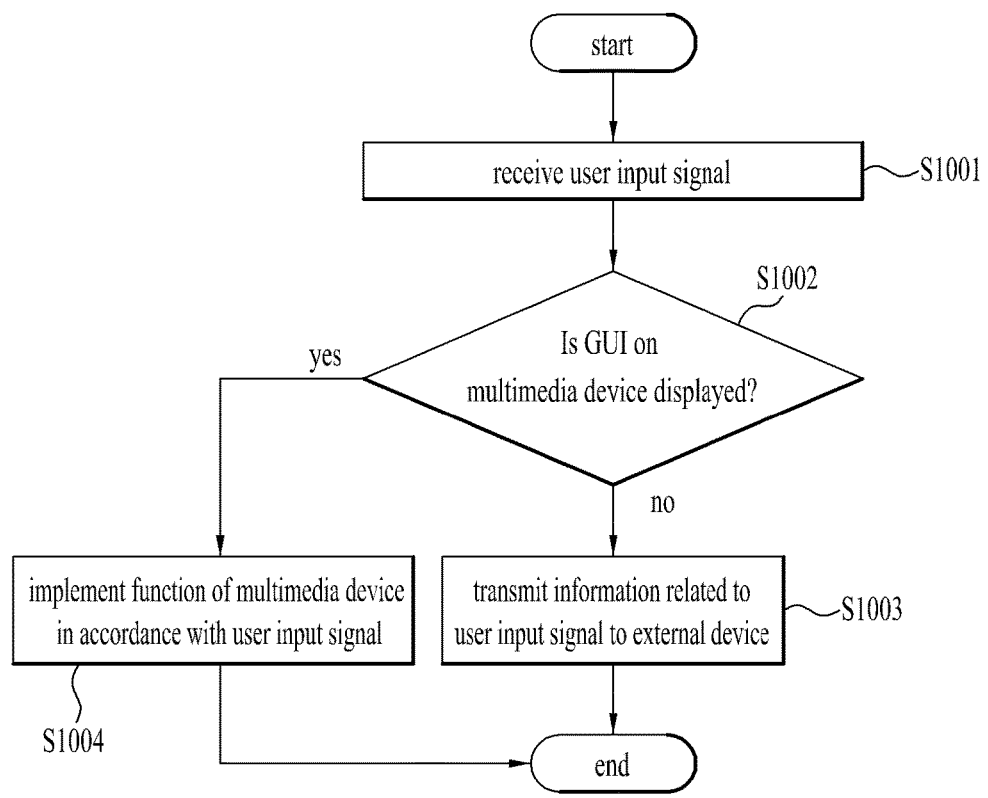
FIG. 16 is a flow chart illustrating an example of a method for controlling a multimedia device according to one embodiment of the present invention.

FIG. 16 is a flow chart illustrating an example of a method for controlling a multimedia device according to one embodiment of the present invention.

The user interface module 180 receives a user input signal in a state that the GUI data received from the specific external device 200 are displayed on the display module 150 (S1001). For example, the user input signal is received from the remote controller 300. In this case, it is assumed that the user input signal is not the signal for displaying the GUI data of the multimedia device 100.

The controller 140 detects whether the GUI data of the multimedia device 100 are displayed on the display module 150 (S1002).

The GUI data of the multimedia device 100 may include graphic images corresponding to the respective functions of the multimedia device 100 to control the respective functions of the multimedia device 100. The functions of the multimedia device 100 include all the functions, which may be implemented by the multimedia device 100, such as channel change, channel selection, volume control, selection of external input mode, implementation of application, and environment setting.

Since the GUI data of the multimedia device 100 are generated by a GUI generator 143 within the controller 140, the controller 140 may easily know whether the GUI data of the multimedia device 100 are displayed on the display module 150.

If the controller 140 fails to detect the GUI data of the multimedia device 100, which are displayed on the display module 150, that is, if the GUI data of the multimedia device 100 are not displayed on the display module 150, the controller 140 controls the network interface module 113 to transmit information related to the user input signal to the external device 200 (S1003). In other words, if the GUI data of the multimedia device 100 are not displayed on the display module 150, the controller 140 transmits a control signal, which is output from the remote controller 300, to the external device 200 through the network interface module 113. This is because that the user intends to control the specific external device 200 by using the remote controller 300 if the GUI data of the multimedia device 100 are not displayed on the display module 150. Since the step S1003 is similar to the aforementioned description in respect of FIGS. 12 and 13, its detailed description will be omitted.

On the other hand, if the controller 140 detects the GUI data of the multimedia device 100, which are displayed on the display module 150, that is, if the GUI data of the multimedia device 100 are displayed on the display module 150, the controller 140 implements the function of the multimedia device 100 in accordance with the user input signal received from the user interface module 180 (S1004). In other words, if the GUI data of the multimedia device 100 are displayed on the display module 150, the controller 140 implements the corresponding function of the multimedia device 100 by processing the control signal, which is output from the remote controller 300, inside the multimedia device 100. This is because that the user intends to control the multimedia device 100 not the specific external device 200 by using the remote controller 300 if the GUI data of the multimedia device 100 are displayed by selection of the user in a state that the GUI data received from the specific external device 200 are displayed. The GUI data of the multimedia device 100 may be displayed on the GUI data of the specific external device 200 on the screen of the display module 150 by being overlaid with the GUI data of the specific external device 200.

If the controller 140 detects the GUI data of the multimedia device, which are displayed on the display module 150, that is, if the GUI data of the multimedia device 100 are displayed on the display module 150, the controller 140 controls the display module 150 to output the indicator I corresponding to the motion of the remote controller 300. The indicator I will be referred to as a first indicator I. The controller 140 controls the display module 150 to calculate coordinate value information on the basis of the signal corresponding to motion, which is received from the remote controller 300, and output the first indicator I in accordance with the calculated coordinate value information.

On the other hand, if the GUI data of the multimedia device 100 are not displayed on the display module 150, since the remote controller 300 is changed to the control mode of the specific external device 200, the indicator I is not displayed. Instead, the specific external device 200 transmits indicator P related information corresponding to the motion of the remote controller 300 to the multimedia device 100 on the basis of the signal corresponding to the coordinate value information transmitted from the multimedia device 100. The external device interface module 120 receives the indicator P related information, and the controller 140 controls the display module 150 to display the indicator P on the basis of the received indicator P related information. The indicator P will be referred to as a second indicator P.

The first indicator I and the second indicator P may set at least one of shape, size, color and transparency differently from each other. The user may recognize whether the remote controller 300 is currently in the control mode of the multimedia device 100 or the control mode of the specific external device 200, on the basis of variation of the indicator output to the display module 150. Since the first indicator I and the second indicator P are similar to those described with reference to FIG. 14, their detailed description will be omitted.

Figure 17:
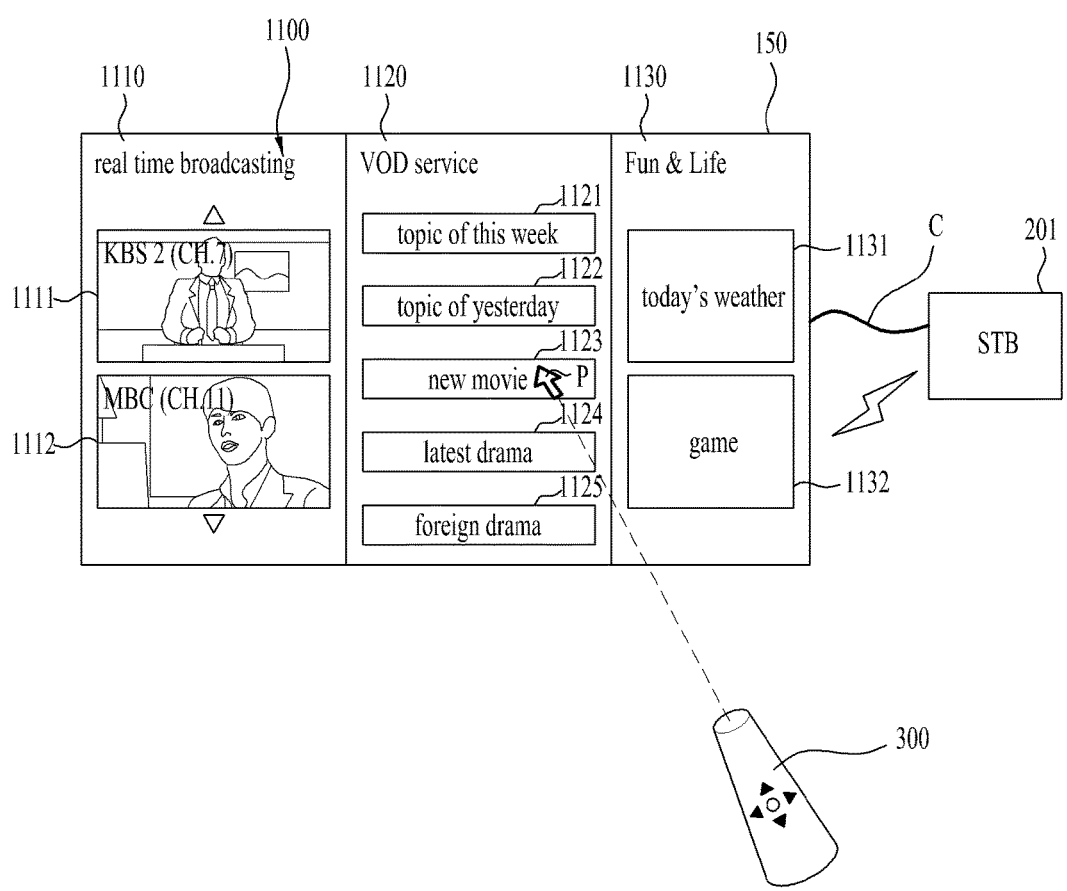
FIG. 17 is a diagram illustrating an example of displaying GUI data of a specific external device, which are received from a specific external device, on a display module of a multimedia device in accordance with one embodiment of the present invention.
Figure 18:
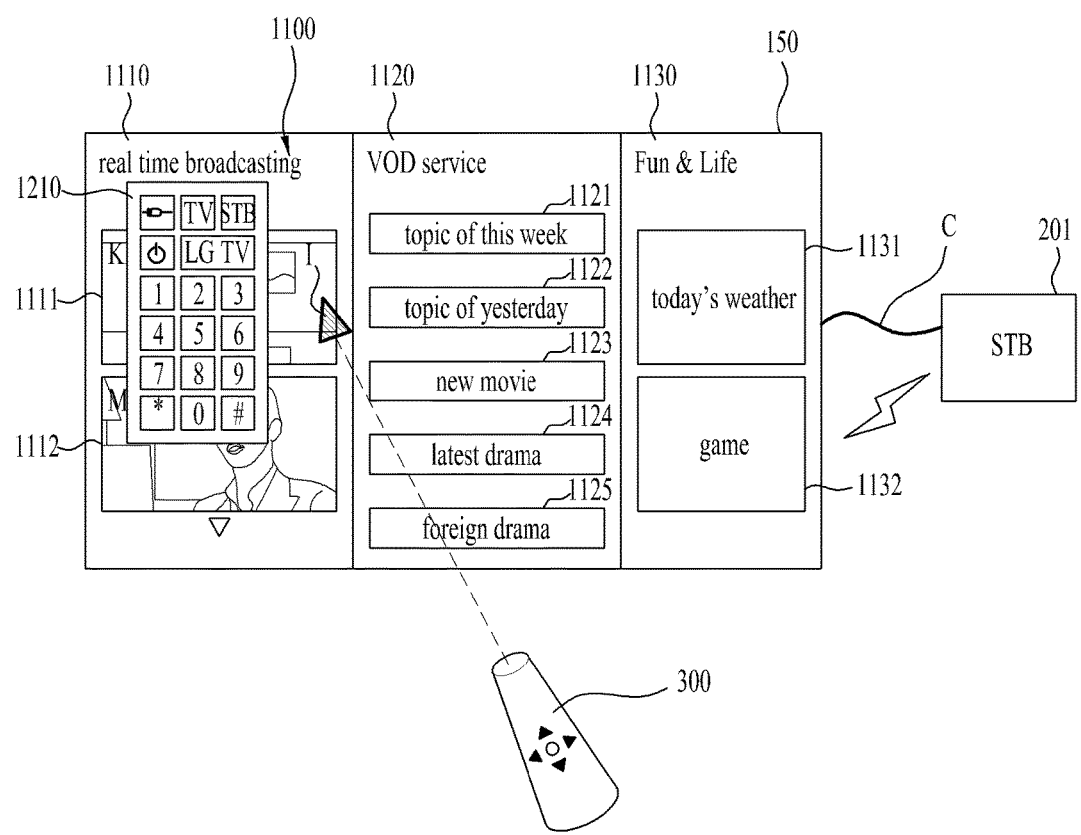
FIG. 18 is a diagram illustrating an example of displaying GUI data of a multimedia device on a display module of the multimedia device in a state that GUI data of a specific external device of FIG. 9 are displayed on the display module of the multimedia device in accordance with one embodiment of the present invention.
Figure 19:
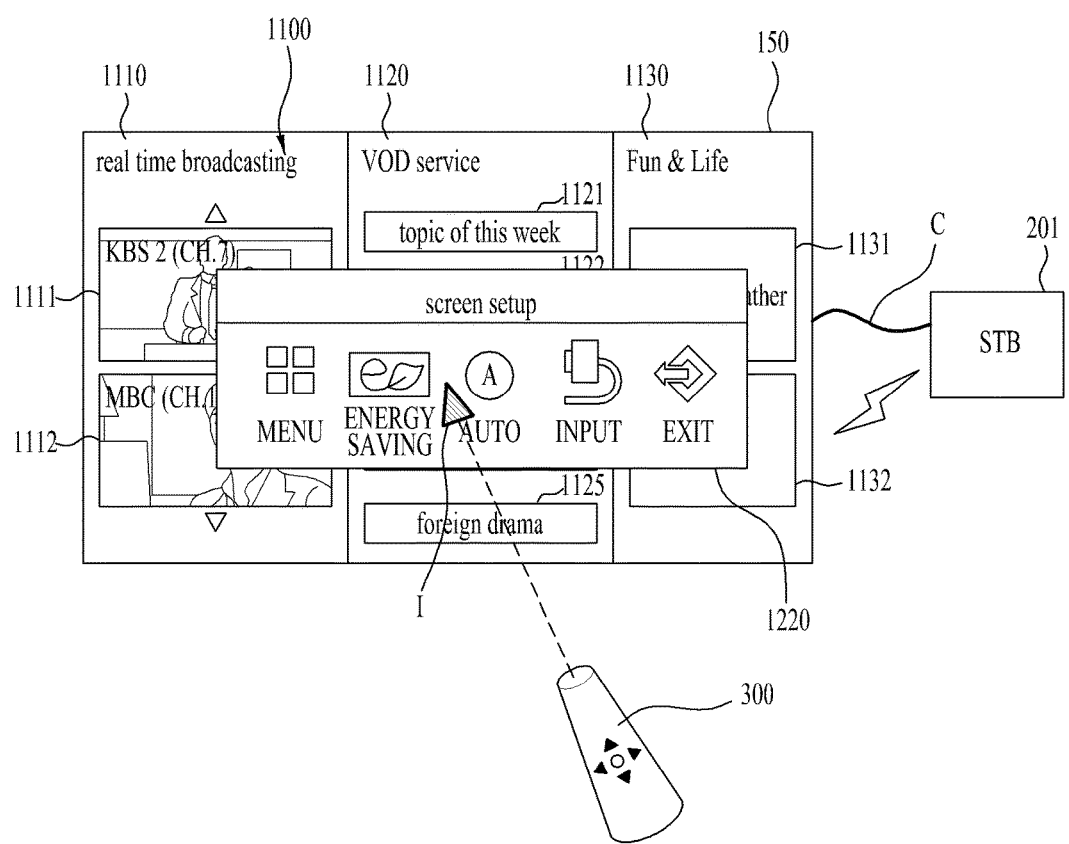
FIG. 19 is a diagram illustrating another example of displaying GUI data of a multimedia device on a display module of the multimedia device in a state that GUI data of a specific external device of FIG. 9 are displayed on the display module of the multimedia device in accordance with one embodiment of the present invention.

FIG. 17 is a diagram illustrating an example of displaying GUI data received from a specific external device on a display module of a multimedia device in accordance with one embodiment of the present invention, FIG. 18 is a diagram illustrating an example of displaying GUI data of a multimedia device on a display module of the multimedia device in a state that GUI data of a specific external device of FIG. 9 are displayed on the display module of the multimedia device in accordance with one embodiment of the present invention, and FIG. 19 is a diagram illustrating another example of displaying GUI data of a multimedia device on a display module of a multimedia device in a state that GUI data of the specific external device of FIG. 9 are displayed on the display module of the multimedia device in accordance with one embodiment of the present invention;

Referring to FIG. 17, GUI data 1100 are displayed on the display module 150 of the multimedia device 100. The GUI data 1100 are received by the external device interface module 120 of the multimedia device 100 from the STB 201.

If the user moves the remote controller 300 or pushes a specific key button provided in the remote controller 300, the user interface module 180 receives a user input signal from the remote controller 300. The user input signal includes at least one of the signal corresponding to the motion of the remote controller 300 or the signal corresponding to the key button provided in the remote controller 300.

Since the GUI data 1100 received from the STB 201 are displayed on the display module 150 and the GUI data of the multimedia device 100 are not displayed thereon, the controller 140 controls the network interface module 113 to transmit information related to the user input signal to the external device 200. The information related to the user input signal includes at least one of the signal corresponding to coordinate value information calculated on the basis of the signal corresponding to the motion of the remote controller 300 or the signal corresponding to the key button provided in the remote controller 300.

The specific external device 200 transmits indicator P related information corresponding to the motion of the remote controller 300 to the multimedia device 100 on the basis of the signal corresponding to the coordinate value information, which is transmitted from the multimedia device 100. The external device interface module 120 receives the indicator P related information, and the controller 140 controls the display module 150 to display the indicator P on the basis of the received indicator P related information. The indicator P will be referred to as a second indicator P. In other words, the second indicator P is intended to control the function (for example, GUI data 1100 of the STB 200) of the STB in accordance with the signal corresponding to the motion of the remote controller 300.

If the user pushes a specific key button provided in the remote controller 300 or a specific local key button provided in the multimedia device 100 while using a service provided by the STB 201, as shown in FIG. 18 or FIG. 19, the GUI data of the multimedia device 100 may be displayed on the display module 150.

For example, referring to FIG. 18, first GUI data 1210 of the multimedia device 100 are also displayed on the display module 150 of the multimedia device 100 together with the GUI data 1100 received from the STB 201.

The first GUI data 1210 is intended to control the function of the multimedia device 100, and may be a screen remote controller, for example. The first GUI data 1210 may include a virtual key button for controlling the functions of the multimedia device 100. The first GUI data 1210 may be displayed on the screen of the display module 150 by being overlaid on the GUI data 1100 of the STB 201.

The user may select the virtual key button within the first GUI data 1210 or the key button provided in the remote controller 300 while moving the remote controller 300.

The controller 140 implements the function of the multimedia device 100 in accordance with the user input signal received from the user interface module 180. The user input signal includes the signal corresponding to the motion of the remote controller 300 or the signal corresponding to the key button provided in the remote controller 300. The controller 140 may implement the function of the multimedia device 100, which is mapped into the received user input signal. Mapping data for mapping the user input signal with the function of the multimedia device 100 are stored in the memory 130. The user may control the multimedia device 100 by using the remote controller 300 to fully stray from the external input mode of the STB 201.

The controller 140 controls the display module 150 to output the indicator I corresponding to the motion of the remote controller 300. The indicator I will be referred to as a first indicator I. The controller 140 controls the display module 150 to calculate coordinate value information on the basis of the signal corresponding to motion, which is received from the remote controller 300 and output the first indicator I in accordance with the calculated coordinate value information. In other words, the first indicator I is intended to control the GUI data of the multimedia device 100 in accordance with the signal corresponding to the motion of the remote controller 300.

According to comparison between FIG. 17 and FIG. 18, the first indicator I and the second indicator P may set at least one of shape, size, color and transparency differently from each other. In other words, if the STB 201 is controlled using the remote controller 300, the second indicator P is displayed on the display module 150. If the multimedia device 100 is controlled using the remote controller 300, the first indicator I different from the second indicator P is displayed on the display module 150. The user may recognize whether the remote controller 300 is currently in the control mode of the multimedia device 100 or the control mode of the specific external device 200, on the basis of variation of the indicator output to the display module 150.

For another example, referring to FIG. 19, second GUI data 1220 of the multimedia device 100 are also displayed on the display module 150 of the multimedia device 100 together with the GUI data 1100 received from the STB 201.

The second GUI data 1220 is intended to control the function of the multimedia device 100, and may be a screen setting window, for example. The second GUI data 1220 may include menu option images for controlling screen setting functions of the multimedia device 100. The second GUI data 1220 may be displayed on the screen of the display module 150 by being overlaid on the GUI data 1100 of the STB 201.

The user may select the menu option image within the second GUI data 1220 or the key button provided in the remote controller 300 by using the remote controller 300.

The controller 140 implements the function of the multimedia device 100 in accordance with the user input signal received from the user interface module 180. The user input signal includes the signal corresponding to the motion of the remote controller 300 or the signal corresponding to the key button provided in the remote controller 300. The controller 140 may implement the function of the multimedia device 100, which is mapped into the received user input signal.

The controller 140 controls the display module 150 to output the first indicator I corresponding to the motion of the remote controller 300.

According to comparison between FIG. 17 and FIG. 19, the first indicator I and the second indicator P may set at least one of shape, size, color and transparency differently from each other.

In the meantime, if at least one of the video data and the GUI data, which are received from the first external device, and the GUI data received from the second external device are together displayed on the display module 150, a problem as to whether the first external device or the second external device should be controlled using the remote controller 300 occurs. This will be described with reference to FIG. 20.

Figure 20:
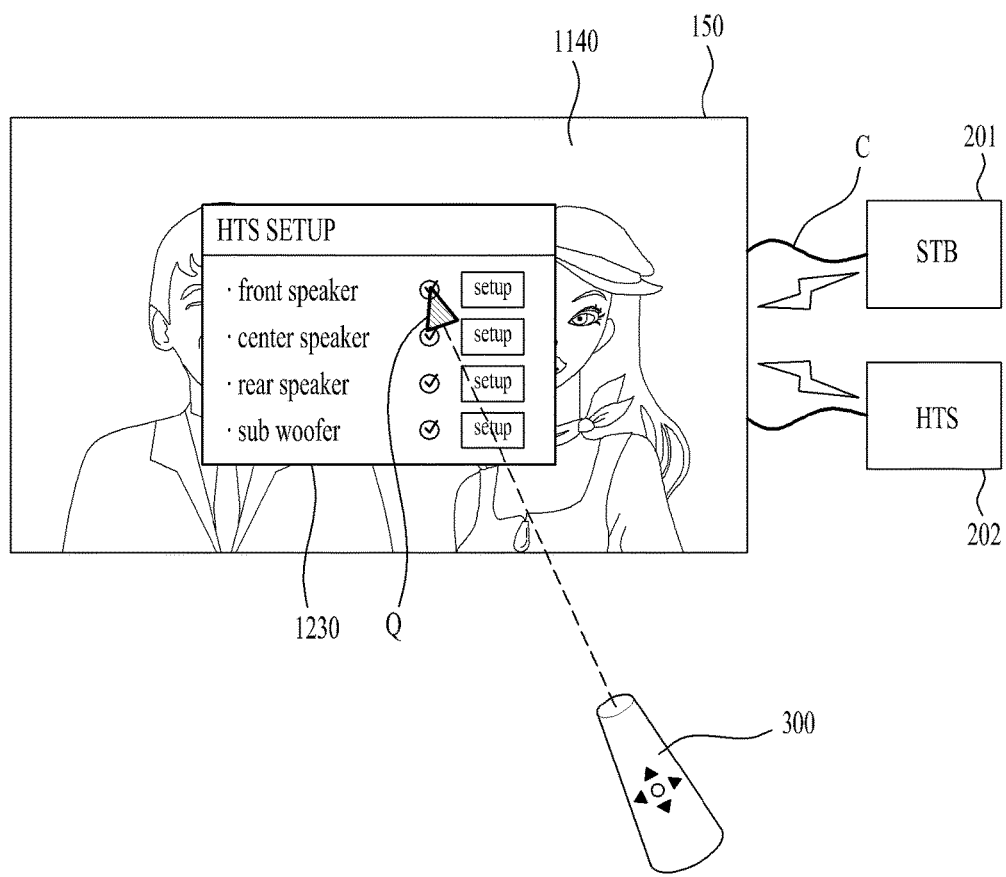
FIG. 20 is a diagram illustrating an example of displaying GUI data received from a second external device on a display module of a multimedia device in a state that video data received from a first external device are displayed on the display module of the multimedia device in accordance with one embodiment of the present invention.

FIG. 20 is a diagram illustrating an example of displaying GUI data received from a second external device on a display module of a multimedia device in a state that video data received from a first external device are displayed on the display module of the multimedia device in accordance with one embodiment of the present invention. In FIG. 20, it is assumed that the first external device is STB 201 and the second external device is HTS 202.

Referring to FIG. 20, video data 1140 received from the STB 201 through the external device interface module 120 are displayed on the display module 150 of the multimedia device 100. Similarly to the description of FIG. 13, if the video data and/GUI data received from the STB 201 are only displayed on the display module 150, the remote controller 300 may be set to the control mode of the STB 201. Accordingly, the controller 140 controls the network interface module 113 to transmit the signal corresponding to the motion, which is received from the remote controller 300, and/or the signal corresponding to the key button to the STB 201.

In a state that the video data 1140 received from the STB 201 are displayed on the display module 150 of the multimedia device 100, if GUI data 1230 of the HTS 202 are received from the HTS 202 through the external device interface module 120, the controller 140 controls the display module 150 to display the video data 1140 and the GUI data 1230 together. The GUI data 1230 of the HTS 202 may be displayed on the video data 1140 by being overlaid on the video data 1140.

The GUI data 1230 of the HTS 202 is intended to control the function of the HTS 202, and may include a menu option corresponding to the function of the HTS 202.

In a state that the video data 1140 received from the STB 201 are displayed on the display module 150 of the multimedia device 100, if the GUI data 1230 of the HTS 202 are displayed by the user, since the user intends to control the HTS 202 not the STB 201 by using the remote controller 300, the remote controller 300 may be changed to the control mode of the HTS 202.

Accordingly, the controller 140 controls the network interface module 113 to transmit the signal corresponding to the motion, which is received from the remote controller 300, and/or the signal corresponding to the key button to the HTS 202. The display module 150 may output a third indicator Q for controlling the GUI data 1230 of the HTS 202 in accordance with the signal corresponding to the motion of the remote controller 300. The third indicator Q may be equal to or different from the second indicator P in at least one of shape, size, color and transparency.

Hereinafter, if at least one of the video data and GUI data received from the specific external device 200 is displayed on the display module 150 together with the GUI data of the multimedia device 100, a second method for controlling the multimedia device 100 and the specific external device 200 by using the remote controller 300 will be described in detail with reference to FIGS. 21 to 25.

Figure 21:
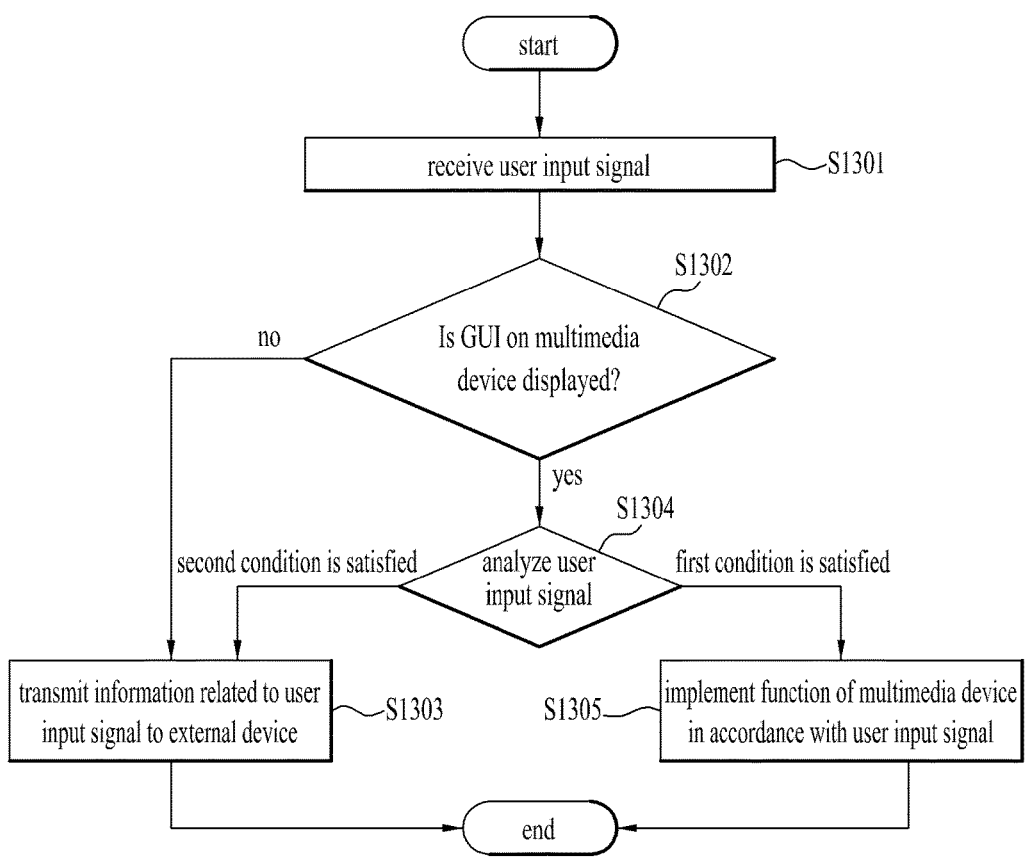
FIG. 21 is a flow chart illustrating another example of a method for controlling a multimedia device according to one embodiment of the present invention.

FIG. 21 is a flow chart illustrating an example of a method for controlling a multimedia device according to one embodiment of the present invention.

The user interface module 180 receives a user input signal in a state that at least one of the video data received from the specific external device 200 and the GUI data of the specific external device 200 is displayed on the display module 150 (S1301). For example, the user input signal is received from the remote controller 300. In this case, it is assumed that the user input signal is not the signal for displaying the GUI data of the multimedia device 100.

The controller 140 detects whether the GUI data of the multimedia device 100 are displayed on the display module 150 (S1302).

Since the GUI data of the multimedia device 100 are generated by a GUI generator 143 within the controller 140, the controller 140 may easily know whether the GUI data of the multimedia device 100 are displayed on the display module 150.

If the controller 140 fails to detect the GUI data of the multimedia device 100, which are displayed on the display module 150, that is, if the GUI data of the multimedia device 100 are not displayed on the display module 150, the controller 140 controls the network interface module 113 to transmit information related to the user input signal to the external device 200 (S1303). In other words, if the GUI data of the multimedia device 100 are not displayed on the display module 150, the controller 140 transmits a control signal, which is output from the remote controller 300, to the external device 200 through the network interface module 113. This is because that the user intends to control the specific external device 200 by using the remote controller 300 if the GUI data of the multimedia device 100 are not displayed on the display module 150. Since the step S1303 is similar to the aforementioned description in respect of FIGS. 12 and 13, its detailed description will be omitted.

On the other hand, if the controller 140 detects the GUI data of the multimedia device 100, which are displayed on the display module 150, that is, if the GUI data of the multimedia device 100 are displayed on the display module 150, the controller 140 performs a corresponding process differently depending on whether a condition of the user input signal is satisfied (S1304).

First of all, the controller 140 implements the function of the multimedia device 100 in accordance with the user input signal if the user input signal satisfies a first condition (S1305). In other words, if the user input signal satisfies the first condition, the controller 140 implements the function of the multimedia device 100, which corresponds to the GUI data of the multimedia device 100, in accordance with the user input signal. In other words, if the control signal output from the remote controller 300 and received by the controller 140 satisfies the first condition, the controller 140 implements the corresponding function by processing the control signal, which is output from the remote controller 300, inside the multimedia device 100.

On the other hand, the controller 140 controls the network interface module 113 to transmit information related to the user input signal to the external device 200 if the user input signal satisfies a second condition (S1303). In other words, if the control signal output from the remote controller 300 and received by the controller 140 satisfies the second condition, the controller 140 transmits the control signal output from the remote controller 300 to the external device 200 through the network interface module 113.

Figure 22:
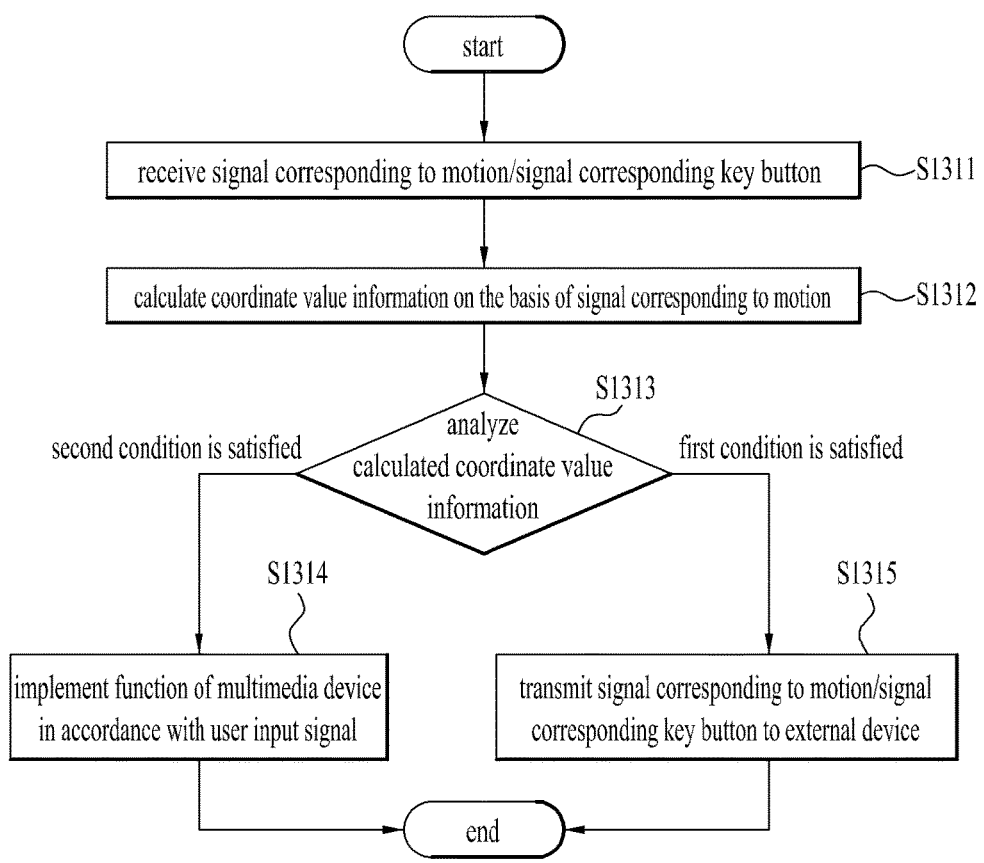
FIG. 22 is a flow chart in more detail illustrating some steps of a method for controlling a multimedia device shown in FIG. 21.

FIG. 22 is a detailed flow chart illustrating some steps of a method for controlling a multimedia device shown in FIG. 21. It is assumed that at least one of video data received from the specific external device 200 and GUI data of the specific external device 200 is displayed on the display module 150 of the multimedia device 100 together with GUI data of the multimedia device 100.

The user interface module 180 receives a signal corresponding to motion and/or a signal corresponding to a key button from the remote controller 300 (S1311).

The controller 140 calculates coordinate value information on the basis of the received signal corresponding to motion (S1312).

The controller 140 performs a corresponding process differently depending on whether a condition of the calculated coordinate value information is satisfied (S1313).

If the calculated coordinate value information satisfies a first condition, the controller 140 implements the function of the multimedia device 100 in accordance with the user input signal (S1314). The first condition means the condition where the calculated coordinate value information corresponds to an area where the GUI data of the multimedia device 100 is displayed on the screen of the display module 150. This is because that the user intends to control the multimedia device 100 not the specific external device 200 by using the remote controller 300 if the coordinate value information corresponds to the area where the GUI data of the multimedia device 100 is displayed on the screen of the display module 150.

For example, if the user pushes a selection key button after locating the remote controller 300 towards the area where the GUI data of the multimedia device 100 are displayed, the coordinate value information calculated on the basis of the signal corresponding to the motion of the remote controller 300 satisfies the first condition. Accordingly, the controller 140 implements the corresponding function of the multimedia device 100 on the basis of the signal corresponding to motion and the signal corresponding to the selection key button.

On the other hand, if the calculated coordinate value information satisfies a second condition, the controller 140 controls the network interface module 113 to transmit information related to the user input signal to the specific external device 200 (S1315). The information related to the user input signal includes the signal corresponding to the calculated coordinate value information and/or the signal corresponding to the key button. The second condition may be the condition where the calculated coordinate value information corresponds to an area where at least one of the video data and the GUI data of the specific external device 200 is displayed on the screen of the display module 150. In other words, the second condition may be the condition corresponding to the area where at least one of the video data and the GUI data of the specific external device 200 is displayed on the screen of the display module 150, as an area except for the area where the GUI data of the multimedia device 100 are displayed on the screen of the display module 150. This is because that the user intends to control the specific external device 200 by using the remote controller 300 if the coordinate value information corresponds to the area where at least one of the video data and the GUI data of the specific external device 200 is displayed on the screen of the display module 150.

For example, if the user pushes the selection key button after locating the remote controller 300 towards at least one of the video data and the GUI data of the specific external device 200 not the GUI data of the multimedia device 100, the coordinate value information calculated on the basis of the signal corresponding to the motion of the remote controller 300 satisfies the second condition. Accordingly, the controller 140 controls the network interface module 113 to transmit the signal corresponding to the coordinate value information and the signal corresponding to the selection key button to the specific external device 200.

If the coordinate value information corresponds to the area where the GUI data of the multimedia device 100 are displayed on the screen of the display module 150, the controller 140 may control the display module 150 to display the first indicator I corresponding to the motion of the remote controller 300.

On the other hand, if the coordinate value information corresponds to the area where at least one of the video data and the GUI data of the specific external device 200 is displayed on the screen of the display module 150, the controller 140 controls the network interface module 113 to transmit the signal corresponding to the calculated coordinate value information to the specific external device 200. The specific external device 200 transmits second indicator P related information corresponding to the motion of the remote controller 300 to the multimedia device 100 on the basis of the signal corresponding to the coordinate value information, and the controller 140 of the multimedia device 100 controls the display module 150 to display the second indicator P corresponding to the motion of the remote controller 300 on the basis of the second indicator P related information.

Accordingly, if the remote controller 300 is located towards the GUI data of the multimedia device 100 on the screen of the display module 150, the first indicator I is displayed on the GUI data of the multimedia device 100. And, if the remote controller 300 is located towards at least one of the video data and the GUI data of the specific external device 200 on the screen of the display module 150, the second indicator P is displayed on video data or the GUI data of the specific external device 200. The first indicator I and the second indicator P may set at least one of shape, size, color and transparency differently from each other.

Figure 23:
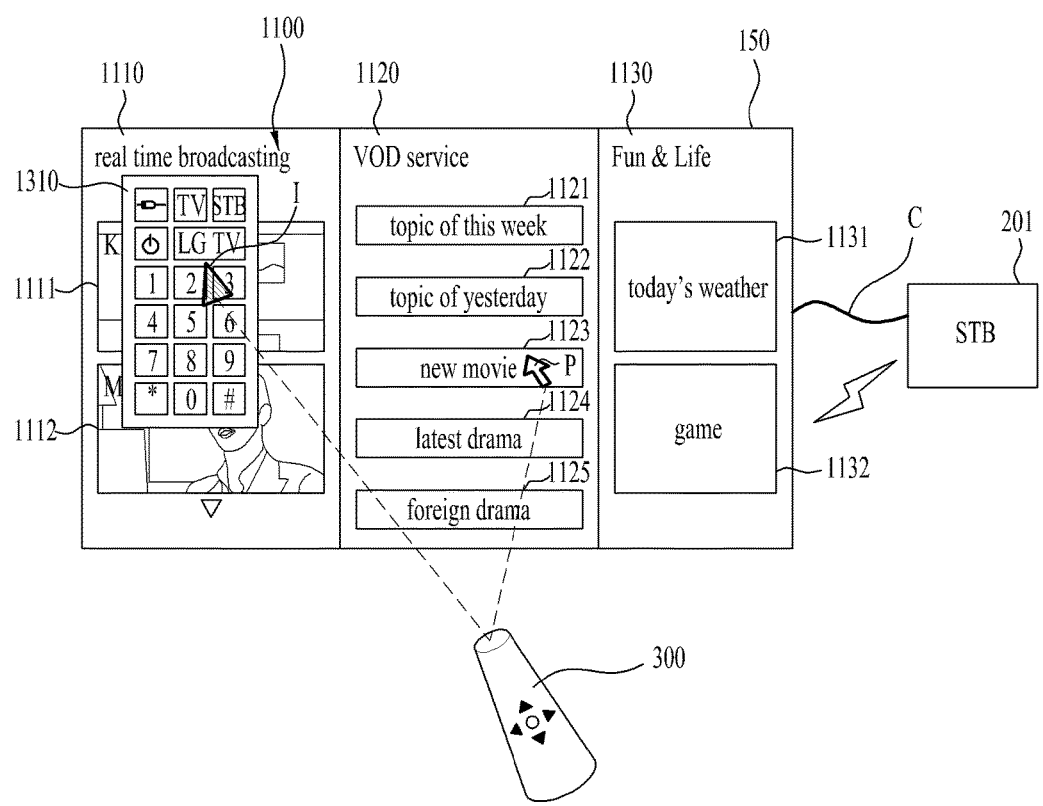
FIG. 23 is a diagram illustrating an example of displaying GUI data of a multimedia device on a display module of the multimedia device in a state that GUI data of a specific external device of FIG. 17 are displayed on the display module of the multimedia device in accordance with one embodiment of the present invention.

FIG. 23 is a diagram illustrating an example of displaying GUI data of a multimedia device on a display module of a multimedia device in a state that GUI data of a specific external device of FIG. 17 are displayed on the display module of the multimedia device in accordance with one embodiment of the present invention.

Referring to FIG. 23, third GUI data 1310 of the multimedia device 100 are also displayed on the display module 150 of the multimedia device 100 together with the GUI data 1100 received from the STB 201.

The third GUI data 1310 is intended to control the function of the multimedia device 100, and may be a screen remote controller, for example. The third GUI data 1310 may include a virtual key button for controlling the functions of the multimedia device 100. The third GUI data 1310 may be displayed on the screen of the display module 150 by being overlaid on the GUI data 1100 of the STB 201.

The user may select the virtual key button within the third GUI data 1310 or the key button provided in the remote controller 300 while moving the remote controller 300.

If the coordinate value information calculated on the basis of the signal corresponding to motion of the remote controller 300 corresponds to an area where the third GUI data 1310 are displayed on the screen of the display module 150, the controller 140 implements the corresponding function of the multimedia device 100 on the basis of the signal corresponding to the motion of the remote controller 300 and the signal corresponding to the key button.

If the coordinate value information calculated on the basis of the signal corresponding to motion of the remote controller 300 corresponds to the area where the third GUI data 1310 are displayed on the screen of the display module 150, the controller 140 may control the display module 150 to display the first indicator I corresponding to the motion of the remote controller 300.

On the other hand, if the coordinate value information calculated on the basis of the signal corresponding to the motion of the remote controller 300 corresponds to the area where the GUI data of the STB 201 are displayed on the screen of the display module 150, as an area except for the area for the third GUI data 1310, the controller 140 controls the network interface module 113 to transmit the signal corresponding to the coordinate value information and the signal corresponding to the key button to the specific external device 200. As a result, the specific function of the STB 201 is implemented.

If the coordinate value information calculated on the basis of the signal corresponding to the motion of the remote controller 300 corresponds to the area where the GUI data of the STB 201 are displayed on the screen of the display module 150, instead of the area where the third GUI data 1310 are displayed, the second indicator P corresponding to the motion of the remote controller 300 is displayed on the display module 150.

Accordingly, if the remote controller 300 is located towards the GUI data of the multimedia device 100 on the screen of the display module 150, the first indicator I is displayed on the GUI data of the multimedia device 100. And, if the remote controller 300 is located towards the GUI data of the STB 201 on the screen of the display module 150, the second indicator P is displayed on the GUI data of the STB 201. The first indicator I and the second indicator P may set at least one of shape, size, color and transparency differently from each other.

In the meantime, as the case may be, the controller 140 may control the multimedia device 100 and the specific external device 200 by analyzing the signal corresponding to the key button provided in the remote controller 300. This will be described with reference to FIGS. 24 and 25.

Figure 24:
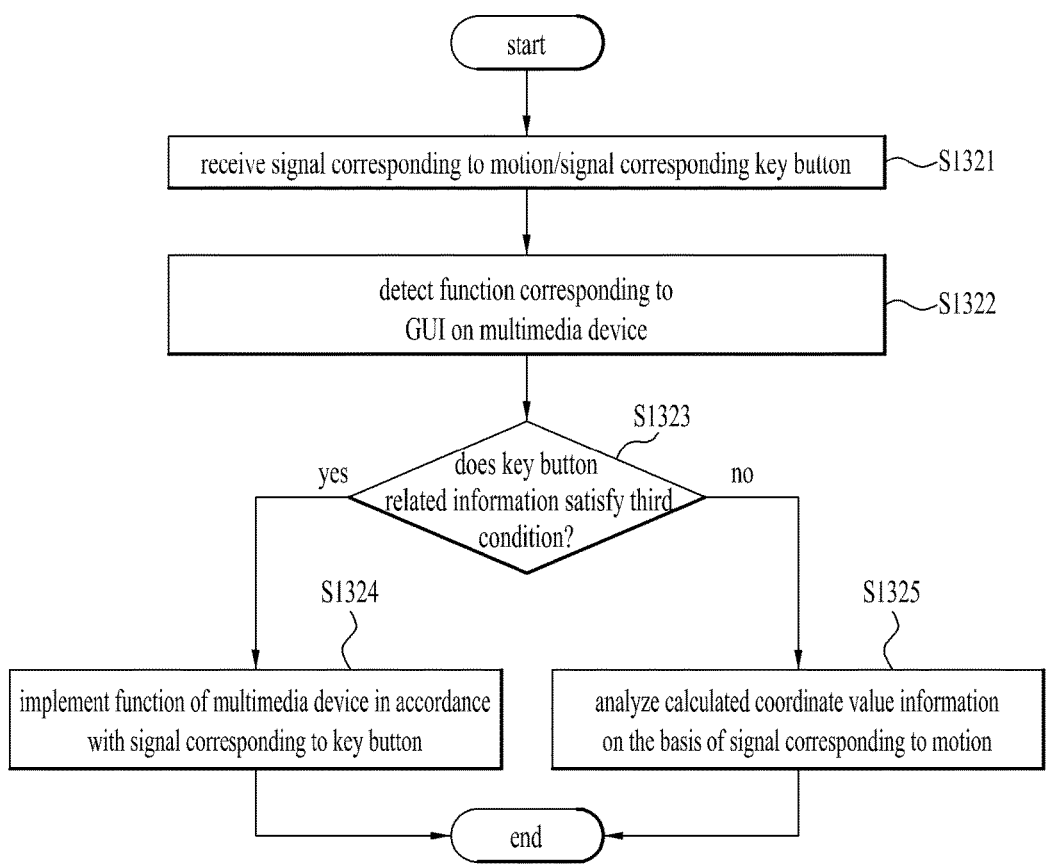
FIG. 24 is a flow chart illustrating an example of a method for controlling a multimedia device and a specific external device in accordance with a signal corresponding to a key button provided in a remote controller.

FIG. 24 is a flow chart illustrating an example of a method for controlling a multimedia device and a specific external device in accordance with a signal corresponding to a key button provided in a remote controller. It is assumed that at least one of video data and GUI data received from the specific external device 200 is displayed on the display module 150 of the multimedia device 100 together with GUI data of the multimedia device 100.

The user interface module 180 receives a signal corresponding to motion and/or a signal corresponding to a key button from the remote controller 300 (S1321).

The controller 140 detects functions corresponding to the GUI data of the multimedia device 100 (S1322). Since the GUI data of the multimedia device 100 are generated by a GUI generator 143 within the controller 140, the controller 140 may easily know the functions corresponding to the GUI data of the multimedia device 100.

For convenience, the functions corresponding to the GUI data of the multimedia device 100 will be referred to as specific type functions. The specific type functions of the multimedia device 100 include similar functions among the functions implemented by the multimedia device 100. For example, if the user listens to music by using the multimedia device 100, similar functions, such as a play function related to listening to music, a pause function, a play stop function, next music selection function, and previous music selection function, may be referred to as the specific type functions.

The controller 140 performs a corresponding process differently depending on whether a condition of the signal corresponding to the key button, which is received from the remote controller 300, is satisfied (S1323).

If the signal corresponding to the key button satisfies the third condition, the controller 140 implements the function of the multimedia device 100 in accordance with the signal corresponding to the key button (S1324). The third condition means the condition related to the specific type function that the signal corresponding to the key button corresponds to the GUI data of the multimedia device 100.

Even though the remote controller 300 is located on the screen of the display module 150 towards the area where the remote controller strays from the GUI data of the multimedia device 100, if the received signal corresponding to the key button is related to the specific type function corresponding to the GUI data of the multimedia device 100, the user intends to control the multimedia device 100 not the specific external device 200 by using the remote controller 300. Accordingly, in this embodiment, if the signal corresponding to the key button satisfies the third condition, whether the first condition and the second condition of the coordinate value information calculated on the basis of the signal corresponding to motion of the remote controller 300 are satisfied may not be considered.

If the signal corresponding to the key button does not satisfy the third condition, the controller 140 may perform a corresponding process differently depending on whether the first condition and the second condition of the coordinate value information calculated on the basis of the signal corresponding to motion of the remote controller 300 are satisfied (S1325). Since this case is similar to the description in respect of FIGS. 21 and 22, the detailed description will be omitted.

Figure 25:
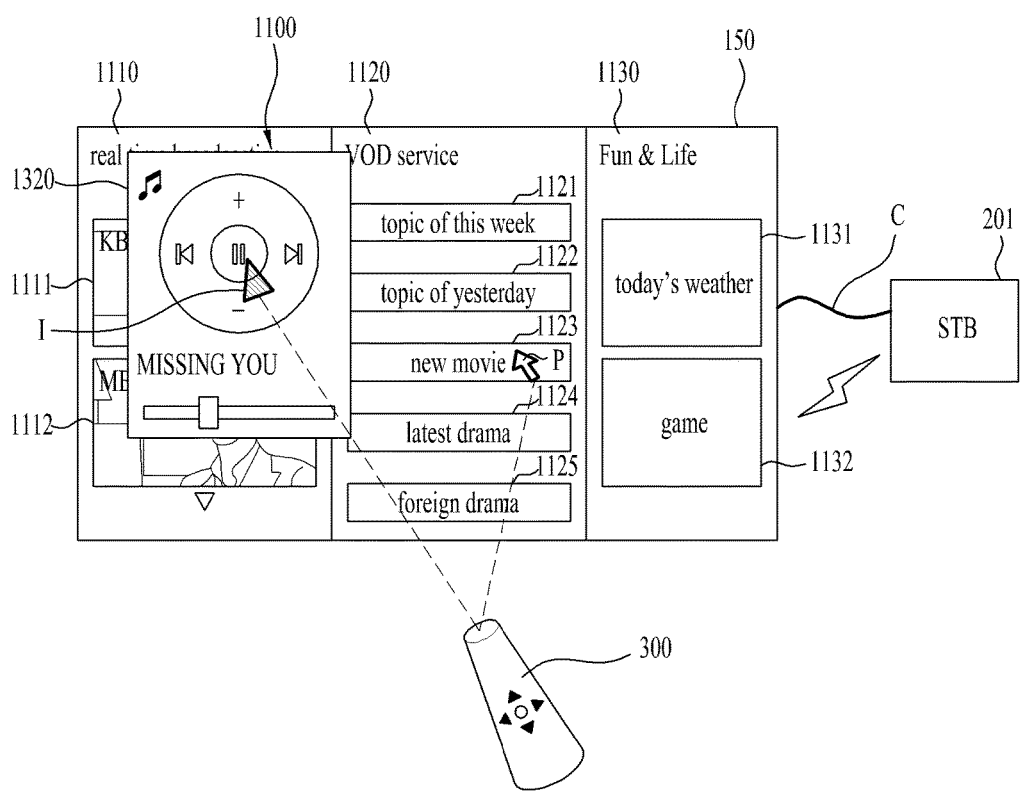
FIG. 25 is a diagram illustrating an example of displaying GUI data of a multimedia device on a display module of the multimedia device in a state that GUI data of a specific external device of FIG. 17 are displayed on the display module of the multimedia device in accordance with one embodiment of the present invention.

FIG. 25 is a diagram illustrating an example of displaying GUI data of a multimedia device on a display module of the multimedia device in a state that GUI data of a specific external device of FIG. 17 are displayed on the display module of the multimedia device in accordance with one embodiment of the present invention. FIG. 25 is a diagram illustrating an example of a method for controlling the multimedia device 100 and the specific external device 200 in accordance with the signal corresponding to the key button provided in the remote controller 300.

Referring to FIG. 25, fourth GUI data 1320 of the multimedia device 100 are also displayed on the display module 150 of the multimedia device 100 together with the GUI data 1100 received from the STB 201.

The fourth GUI data 1320 is intended to control the function of the multimedia device 100, and may be intended to control the music play related function of the multimedia device 100, for example. The fourth GUI data 1320 may include a virtual key button for controlling the music play related function of the multimedia device 100. The fourth GUI data 1320 may be displayed on the screen of the display module 150 by being overlaid on the GUI data 1100 of the STB 201.

The user may select the virtual key button within the fourth GUI data 1320 or the key button provided in the remote controller 300 while moving the remote controller 300.

If the signal corresponding to the key button, which is received from the remote controller 300, is related to the specific type function corresponding to the fourth GUI data 1320, the controller 140 implements the corresponding function of the multimedia device 100 in accordance with the signal corresponding to the key button.

For example, it is assumed that the user pushes a play key button provided in the remote controller 300 in a state that the user locates the remote controller 300 towards the GUI data 1100 of the STB 201 not the fourth GUI data 1320. Since the play key button is related to the music play related function corresponding to the fourth GUI data 1320, the controller may perform the corresponding function of the multimedia device 100 on the basis of the signal corresponding to the play key button even though the coordinate value information calculated on the basis of the signal corresponding to motion of the remote controller 300 does not correspond to the area where the fourth GUI data 1320 are displayed on the screen of the display module 150.

On the other hand, if the signal corresponding to the key button, which is received from the remote controller 300, is not related to the specific type function corresponding to the fourth GUI data 1320, the controller 140 may perform the corresponding process differently depending on whether the coordinate value information calculated on the basis of the signal corresponding to the motion of the remote controller 300 corresponds to the area where the fourth GUI data 1320 are displayed on the screen of the display module 150 or the area where the GUI data 1100 of the STB 201 are displayed thereon. Since this case is similar to the description in respect of FIGS. 22 and 23, the detailed description will be omitted.

Hereinafter, if at least one of the video data and GUI data received from the specific external device 200 is displayed on the display module 150 together with the GUI data of the multimedia device 100, a third method for controlling the multimedia device 100 and the specific external device 200 by using the remote controller 300 will be described in detail with reference to FIGS. 26 to 28.

Figure 26:
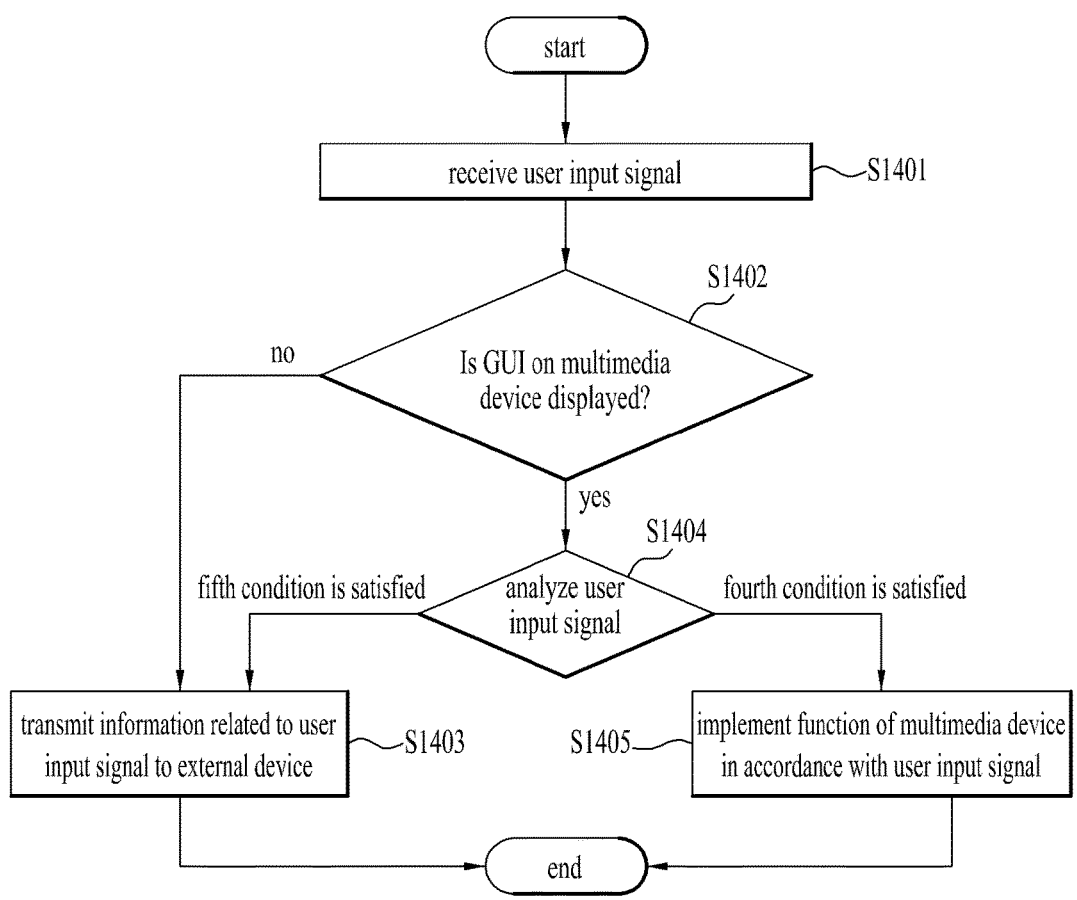
FIG. 26 is a flow chart illustrating still another example of a method for controlling a multimedia device according to one embodiment of the present invention.

FIG. 26 is a flow chart illustrating still another example of a method for controlling a multimedia device according to one embodiment of the present invention.

The user interface module 180 receives a user input signal in a state that at least one of the video data and GUI data received from the specific external device 200 is displayed on the display module 150 (S1401). For example, the user input signal may be received from the remote controller 300, or may be received through the sensor module within the user interface module 180. In this case, it is assumed that the user input signal is not the signal for displaying the GUI data of the multimedia device 100.

The controller 140 detects whether the GUI data of the multimedia device 100 are displayed on the display module 150 (S1402).

Since the GUI data of the multimedia device 100 are generated by a GUI generator 143 within the controller 140, the controller 140 may easily know whether the GUI data of the multimedia device 100 are displayed on the display module 150.

If the controller 140 fails to detect the GUI data of the multimedia device 100, which are displayed on the display module 150, that is, if the GUI data of the multimedia device 100 are not displayed on the display module 150, the controller 140 controls the network interface module 113 to transmit information related to the user input signal to the external device 200 (S1403). This is because that the user intends to control the specific external device 200 by using the remote controller 300 if the GUI data of the multimedia device 100 are not displayed on the display module 150. Since the step S1403 is similar to the aforementioned description in respect of FIGS. 12 and 13, its detailed description will be omitted.

On the other hand, if the controller 140 detects the GUI data of the multimedia device 100, which are displayed on the display module 150, that is, if the GUI data of the multimedia device 100 are displayed on the display module 150, the controller 140 performs the corresponding process differently depending on whether a condition of the user input signal is satisfied (S1404).

First of all, the controller 140 implements the function of the multimedia device 100 in accordance with the user input signal if the user input signal satisfies a fourth condition (S1405). In other words, if the user input signal satisfies the fourth condition, the controller 140 implements the function of the multimedia device 100, which corresponds to the GUI data of the multimedia device 100, in accordance with the user input signal.

On the other hand, the controller 140 controls the network interface module 113 to transmit the information related to the user input signal to the external device 200 if the user input signal satisfies a fifth condition (S1403).

For example, the fourth condition and the fifth condition may be determined depending on whether the user input signal is received from the remote controller 300 or through the sensor module within the user interface module 180. For example, if the user inputs a user command by using the remote controller 300, the user input signal received from the user interface module 180 may be regarded as the user input signal that satisfies the fourth condition. If the user inputs the user command by uttering a specific voice or taking a specific gesture, the user input signal received through the sensor module within the user interface module 180 may be regarded as the user input signal that satisfies the fifth condition.

Otherwise, if the user inputs the user command by using the remote controller 300, the signal corresponding to the key button of the remote controller 300 corresponding to the function of the GUI data of the multimedia device 100 may be regarded as the user input signal that satisfies the fourth condition, and the signal corresponding to the motion of the remote controller 300 may be regarded as the user input signal that satisfies the fifth condition.

Otherwise, if the user inputs the user command by using the remote controller 300, the signal corresponding to the motion of the remote controller 300 may be regarded as the user input signal that satisfies the fourth condition, and the signal corresponding to a four-directional key button provided in the remote controller 300 may be regarded as the user input signal that satisfies the fifth condition.

Otherwise, if the user inputs the user command by using the remote controller 300, the signal corresponding to the motion of the remote controller 300 may be regarded as the user input signal that satisfies the fourth condition, and information related to a touch pad (not shown) provided in the remote controller 300 may be regarded as the user input signal that satisfies the fifth condition.

However, the aforementioned methods for regarding the user input signal as the signal that satisfies the fourth condition or the signal that satisfies the fifth condition are only exemplary and are not limited to the aforementioned examples.

Figure 27:
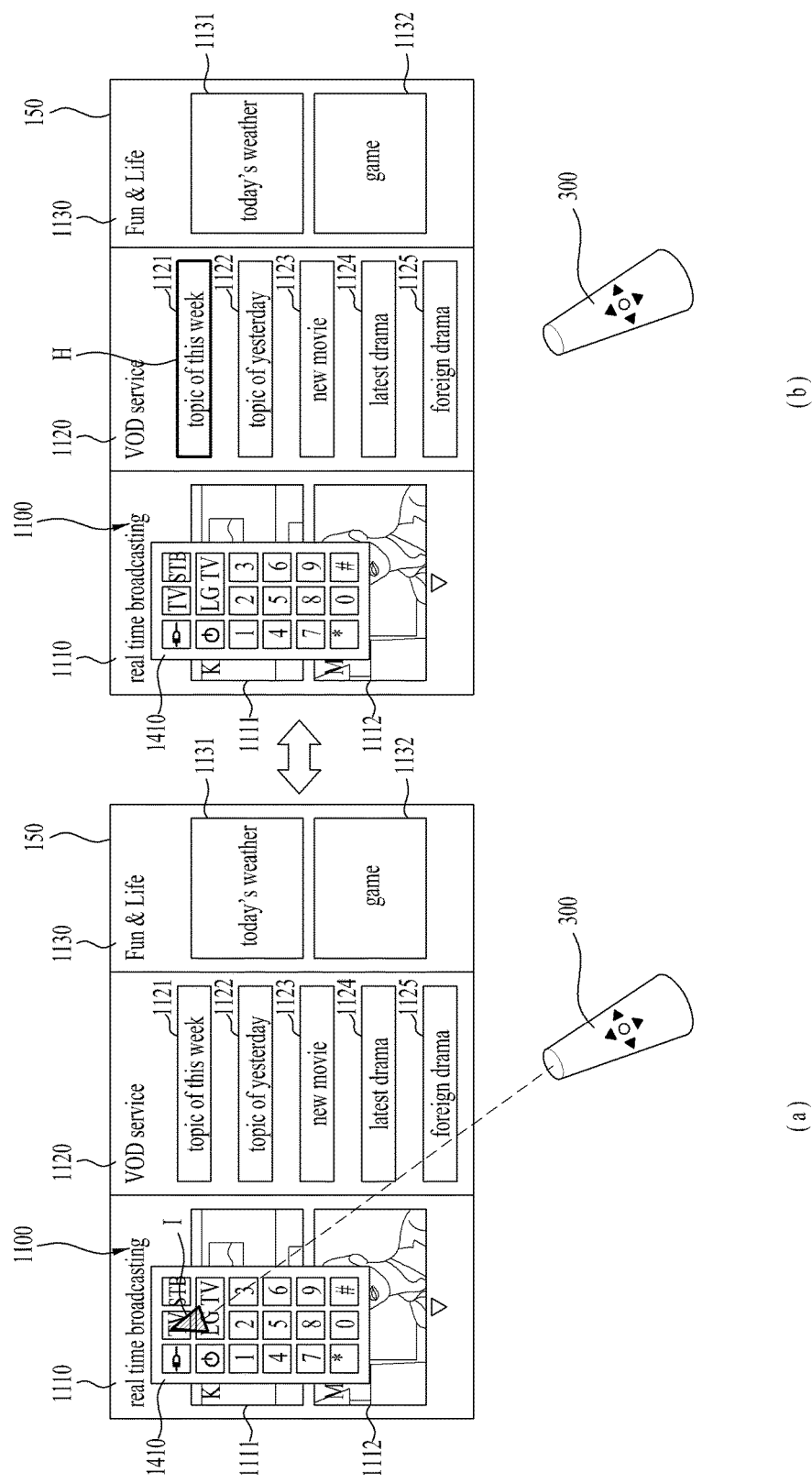
FIGS. 27 and 28 are diagrams illustrating an example of displaying GUI data of a multimedia device on a display module of the multimedia device in a state that GUI data of a specific external device of FIG. 17 are displayed on the display module of the multimedia device in accordance with one embodiment of the present invention.
Figure 28:
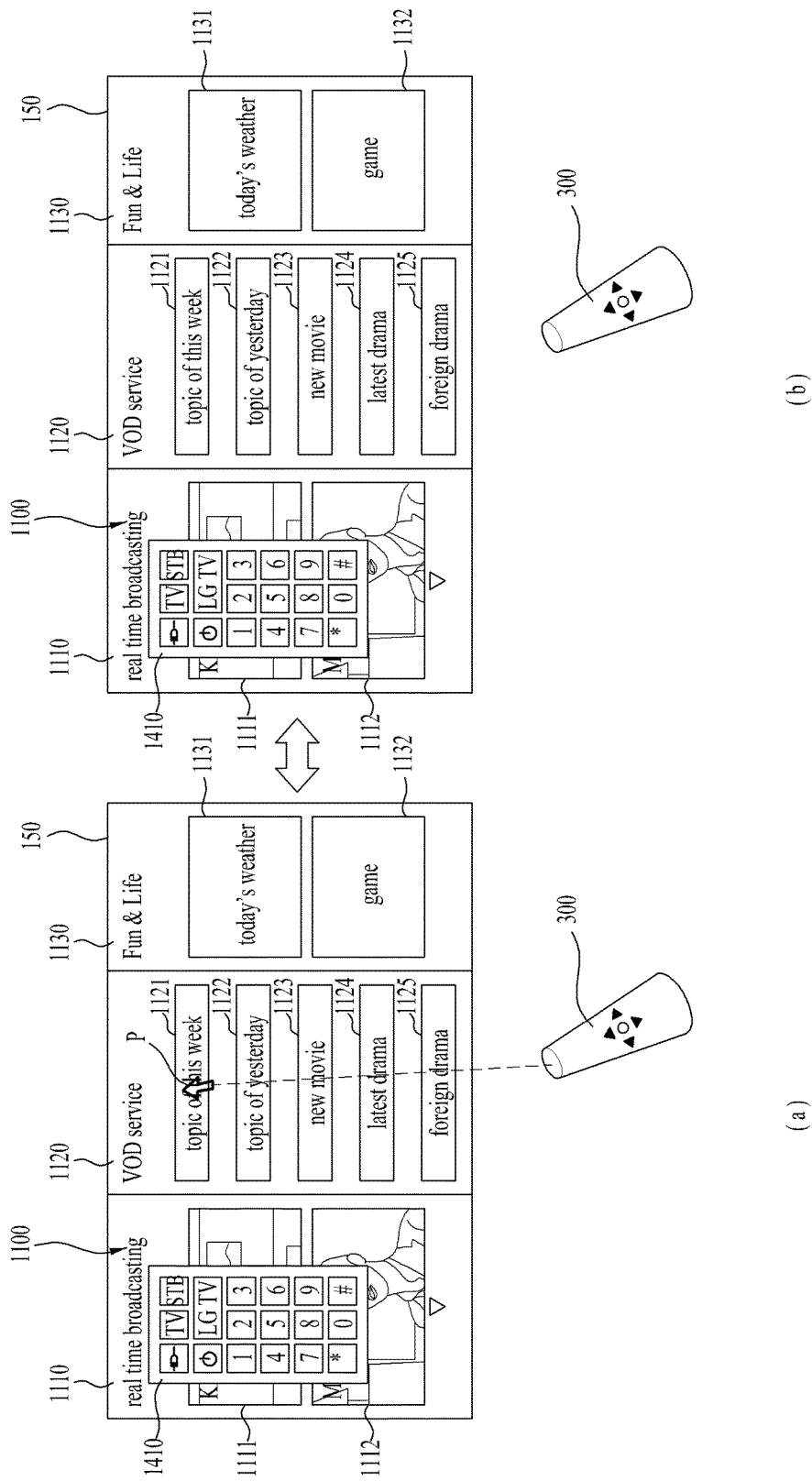

FIGS. 27 and 28 are diagrams illustrating an example of displaying GUI data of a multimedia device on a display module of the multimedia device in a state that GUI data of a specific external device of FIG. 17 are displayed on the display module of the multimedia device in accordance with one embodiment of the present invention. For convenience, the external device 200 is not shown in FIGS. 27 and 28.

Referring to (a) of FIG. 27, fifth GUI data 1410 of the multimedia device 100 are also displayed on the display module 150 of the multimedia device 100 together with the GUI data 1100 received from the STB 201.

The fifth GUI data 1310 is intended to control the function of the multimedia device 100, and may be a screen remote controller, for example. The fifth GUI data 1410 may include a virtual key button for controlling the functions of the multimedia device 100. The fifth GUI data 1410 may be displayed on the screen of the display module 150 by being overlaid on the GUI data 1100 of the STB 201.

If the user input signal corresponding to the first function of the remote controller 300 is received, the controller 140 transmits information related to the user input signal corresponding to the first function to the STB 201. If the user input signal corresponding to the second function of the remote controller 300 is received, the controller 140 implements the function of the multimedia device 100 in accordance with the user input signal corresponding to the second function.

For example, on the assumption that the first function of the remote controller 300 is the function of a four-directional key button of the remote controller 300, and the second function of the remote controller 300 is the function corresponding to the motion of the remote controller 300, description will be made as follows.

If the user input signal received from the user interface module 180 includes the signal corresponding to the motion of the remote controller 300, the controller 140 implements the function of the multimedia device 100 in accordance with the user input signal.

For example, if the user selects the virtual key button within the fifth GUI data 1410 or the selection key button provided in the remote controller 300 while moving the remote controller 300, the remote controller 300 is set to the control mode of the multimedia device 100. Accordingly, the controller 140 implements the corresponding function of the multimedia device 100 in accordance with the signal corresponding to the motion of the remote controller 300 or the signal corresponding to the selection key button.

On the other hand, if the user input signal received by the user interface module 180 includes the signal corresponding to the four-directional key button provided in the remote controller, the controller 140 controls the network interface module 113 to transmit the information related to the user input signal to the STB 201.

For example, if the user selects the four-directional key button provided in the remote controller 300 without moving the remote controller 300, as shown in (b) of FIG. 27, the remote controller 300 is set to the control mode of the STB 201. Accordingly, the multimedia device 100 transmits the signal corresponding to the four-directional key button of the remote controller 300 to the STB 201. In this case, the STB 201 may transmit a highlighted (H) result of a specific menu option to the multimedia device 100 in accordance with the signal corresponding to the four-directional key button transmitted from the multimedia device 100, and may control the display module 150 to display the highlighted (H) result of the specific menu option.

If the user receives the signal corresponding to the motion of the remote controller 300 from the user interface module 180 by moving the remote controller 300, the remote controller 300 may return to the control mode of the multimedia device 100 as shown in (a) of FIG. 27. Also, if the user again selects the four-directional key button provided in the remote controller 300, the remote controller 300 may return to the control mode of the STB 201 as shown in (b) of FIG. 27.

In (a) of FIG. 27, since the remote controller 300 is set to the control mode of the multimedia device 100, the first indicator I is displayed on the display module 150. In (b) of FIG. 27, since the remote controller 300 is limited to a case where the remote controller 300 is set to the control mode of the STB 201 and is not moved, no indicator may be displayed on the display module 150.

As described above, the present invention may be implemented in such a manner that the first function of the remote controller 300 is the function corresponding to the motion of the remote controller 300 and the second function of the remote controller 300 is the function of the four-directional key button.

For another example, the case where the first function of the remote controller 300 is the function corresponding to the motion of the remote controller 300 and the second function of the remote controller 300 is the function of the specific key button of the remote controller 300 corresponding to the function of the fifth GUI data 1410 will be described with reference to FIG. 28.

As shown in (a) of FIG. 28, if the user input signal received from the user interface module 180 includes the signal corresponding to the motion of the remote controller 300, the controller 140 implements the function of the multimedia device 100 in accordance with the user input signal.

On the other hand, as shown in (b) of FIG. 28, if the user input signal received from the user interface module 180 is the signal corresponding to the function of the fifth GUI data 1410 among the signals corresponding to the key button provided in the remote controller 300, the controller 140 controls the network interface module 113 to transmit the information related to the user input signal to the STB 201.

In (a) of FIG. 28, since the remote controller 300 is set to the control mode of the STB 201, the first indicator I is displayed on the display module 150.

Figure 29:
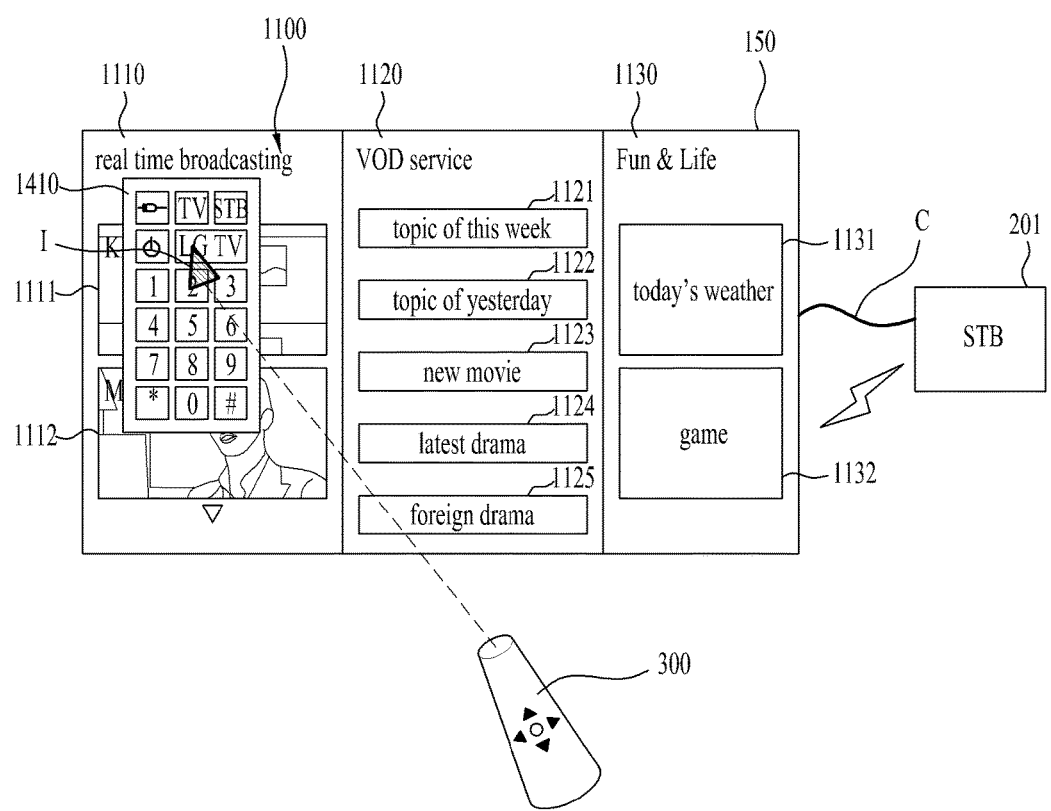
FIG. 29 is a diagram illustrating another example of displaying GUI data of a multimedia device on a display module of the multimedia device in a state that GUI data of a specific external device of FIG. 17 are displayed on the display module of the multimedia device in accordance with one embodiment of the present invention.

FIG. 29 is a diagram illustrating another example of displaying GUI data of a multimedia device on a display module of the multimedia device in a state that GUI data of a specific external device of FIG. 17 are displayed on the display module of the multimedia device in accordance with one embodiment of the present invention.

Referring to FIG. 29, fifth GUI data 1410 of the multimedia device 100 are also displayed on the display module 150 of the multimedia device 100 together with the GUI data 1100 received from the STB 201.

If the user input signal is received from the remote controller 300, the controller 140 implements the function of the multimedia device 100 in accordance with the user input signal. For example, if the user inputs the user command by using the remote controller 300, the remote controller 300 is set to the control mode of the multimedia device 100. Accordingly, the controller 140 implements the corresponding function of the multimedia device 100 in accordance with the signal corresponding to the motion of the remote controller 300 and the signal corresponding to the selection key button. And, the controller 140 controls the display module 150 to display the first indicator I corresponding to the motion of the remote controller 300.

On the other hand, if the user input signal is received through the sensor module within the user interface module 180, the controller 140 controls the network interface module 113 to transmit the information related to the user input signal to the STB 201. For example, if the user inputs the user command by uttering a specific voice or taking a specific gesture, the remote controller 300 is set to the control mode of the STB 201. The information related to the user input signal may include the result of text converted from the specific voice or specific gesture recognized by the controller 140. At this time, the first indicator I may be displayed on the display module 150 in an inactive state, or may not be displayed on the display module 150.

Although the case where the user input signal that satisfies the fourth condition is the user input signal received from the remote controller 300 and the user input signal that satisfies the fifth condition is the user input signal received through the sensor module within the user interface module 180 has been exemplarily described with reference to FIG. 29, the present invention is not limited to the example of FIG. 29.

Although the case where the multimedia device 100 and the STB 201 are controlled has been exemplarily described as above, three or more devices including the multimedia device 100 may be controlled. For example, the present invention may be implemented to control the multimedia device 100 in accordance with the signal corresponding to the motion of the remote control 300 and control the STB 201 in accordance with the signal corresponding to the four-directional key button of the remote controller 300, and control the other external device 200 in accordance with the user input signal received through the sensor module within the user interface module 180.

Figure 30:
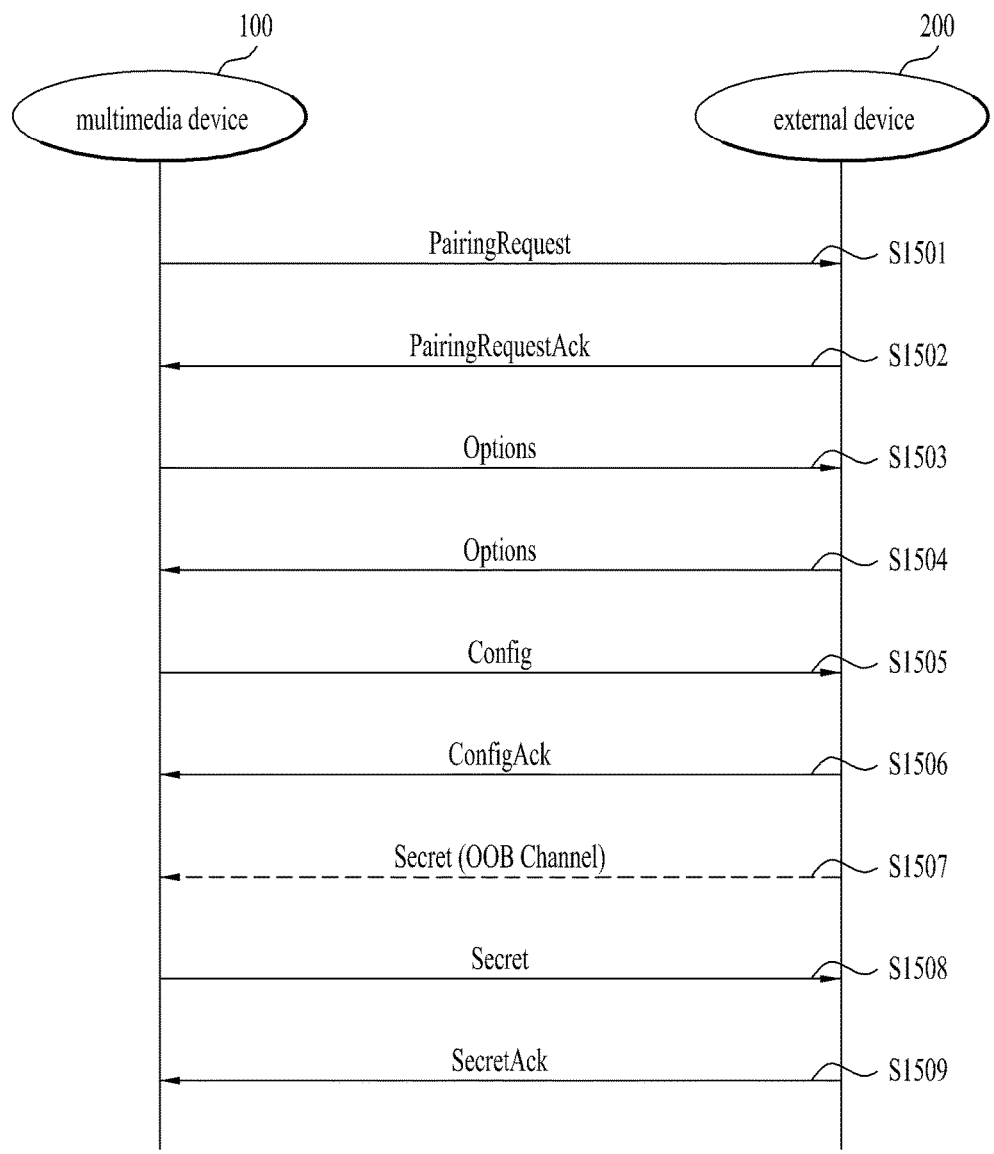
FIG. 30 is a flow chart illustrating an example of a process of a multimedia device that performs pairing with an external device.

FIG. 30 is a flow chart illustrating an example of a process of a multimedia device that performs pairing with an external device. However, it is to be understood that the process for performing pairing with the external device in the multimedia device is not limited to FIG. 30.

First of all, the multimedia device 100 transmits a PairingRequest message indicating reset of the pairing process to the external device 200 (S1501). And, the external device 200 responds to the multimedia device 100 through a PairingRequestAck message (S1502).

The multimedia device 100 transmits an option, which may process a random number value, to the external device 200 (S1503). In this case, the multimedia device 100 may transmit a type of the random number value, which may be processed, to the external device 200.

The external device 200 transmits the option, which may process the random number value, to the multimedia device 100 (S1504). In this case, the external device 200 may transmit a random number value, which may be generated, and a response message, which may be received, to the multimedia device 100.

The multimedia device 100 transmits detailed configuration information of the random number value to the external device 200 as a configuration message Config (S1505). The external device 200 responds to the multimedia device 100 through ConfigAck (S1506).

Afterwards, the multimedia device 100 and the external device 200 exchange a secret key with each other (S1507). In more detail, the secret key may be exchanged in such a manner that the external device 200 generates a proper random number value and then transmits the generated random number value to the user, and the user responds to the random number.

If the user responds to the random number value, the multimedia device 100 acknowledges the response. As a result, if the acknowledged result is correct, the multimedia device transmits a secret message to the external device 200 (S1508).

Then, the external device 200 acknowledges the response, and as a result, if the acknowledged result is correct, the external device 200 transmits SecretAck to the multimedia device 100 (S1509).

For example, the aforementioned pairing process may use a secure socket layer (SSL) rule with a short active time to prevent message spinning from occurring.

If the pairing process shown in FIG. 30 is performed between the multimedia device 100 and the external device 200, pairing may be completed without the procedure for input of the secret key.

Figure 31:
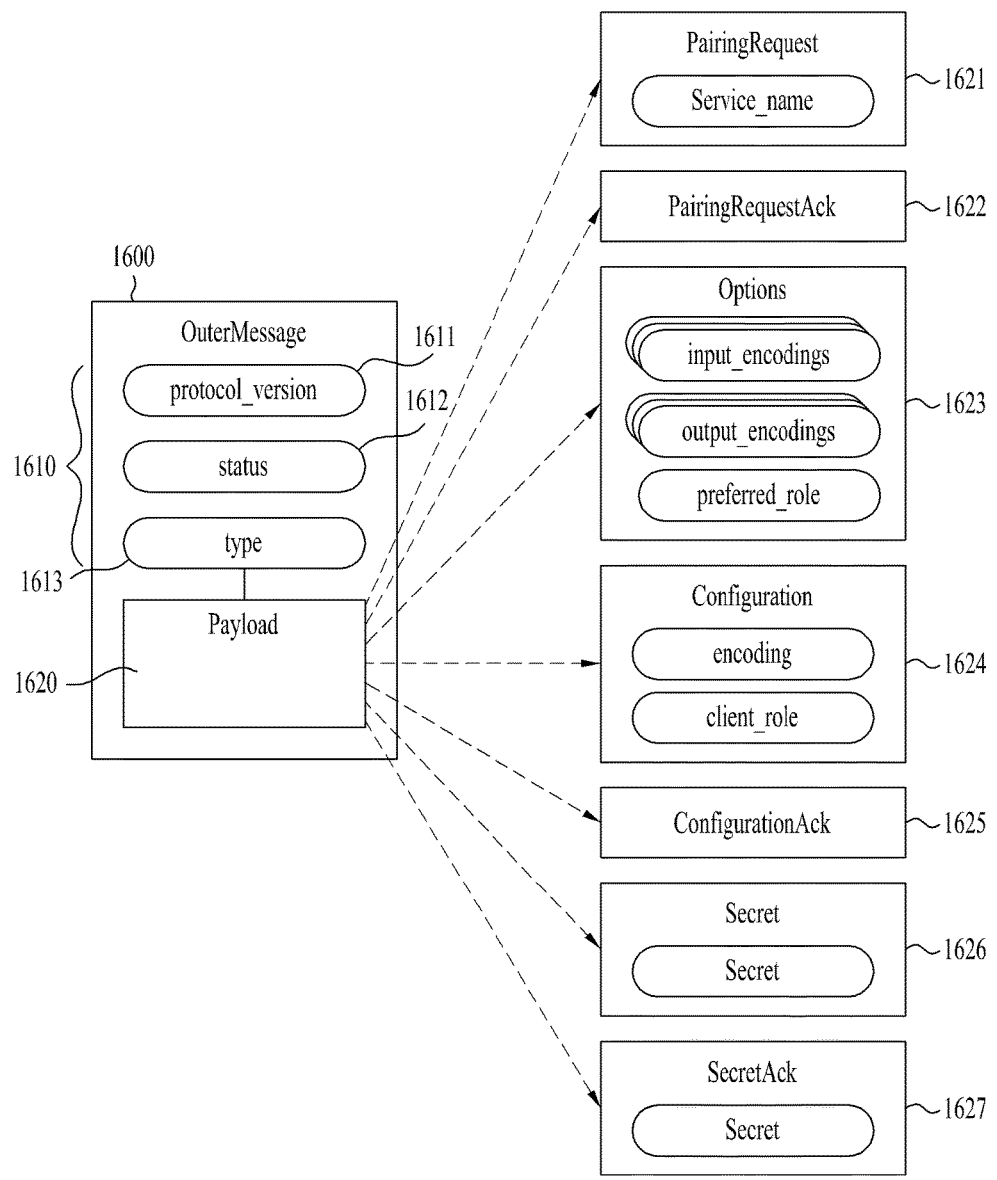
FIG. 31 is a diagram illustrating an example of a message type exchanged between a multimedia device and an external device in the process of FIG. 30.

FIG. 31 is a diagram illustrating an example of a message type exchanged between a multimedia device and an external device in the process of FIG. 30. However, it is to be understood that the message type exchanged between the multimedia device 100 and the external device 200 is not limited to FIG. 31.

Referring to FIG. 31, a message 1600 exchanged between the multimedia device 100 and the external device 200 is an outer message secreted for all the messages which are exchanged, and includes a common header field 1610 and an inner payload 1620 which is a lower message.

The common header field 1610 includes protocol_version 1611 and status 1612 as two essential fields. The protocol_version 1611 is an integer value indicating version of a current protocol, and is used for backward compatibility during protocol extension. The status 1612 is an integer value indicating the status of the protocol. For example, if the status code is OK, the status 1612 is '200', and means that a previously message (if any) has been received and next message of the protocol may be transmitted. If the status 1612 has a value other than '200', it means that an error occurs in transmission and session has ended. The common header field 1610 is a selective field, and may further include a type 1613. The type 1613 should include an integer type number indicating payload 1620 if the status code is OK.

A PairingRequest message 1621, a PairingRequestAck message 1622, an Options message 1623, a Configuration message 1624, a ConfigurationAck message 1625, a Secret message 1626, or a SecretAck message 1627 may respectively be included in the inner payload 1620.

Figure 32:
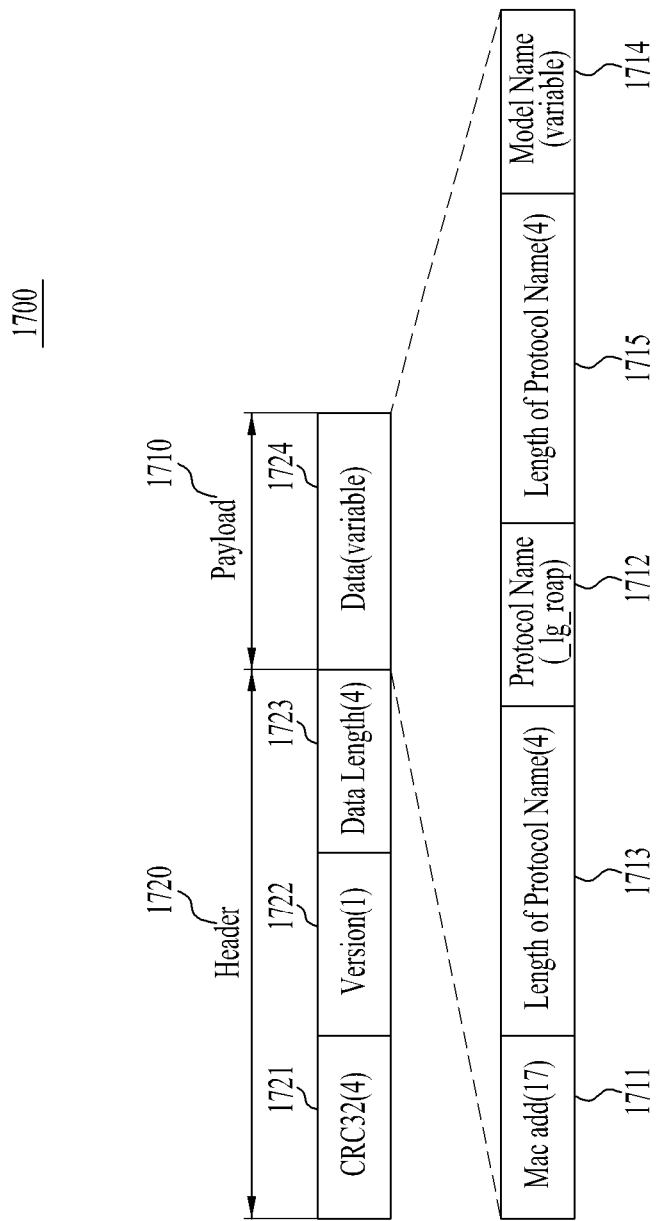
FIG. 32 is a diagram illustrating an example of a data packet transmitted from a multimedia device to external devices when the multimedia device searches for the external devices within the same network.

FIG. 32 is a diagram illustrating an example of a data packet transmitted from a multimedia device to external devices when the multimedia device searches for the external devices within the same network. However, it is to be understood that the structure of the data packet transmitted from the multimedia device to external devices when the multimedia device searches for the external devices within the same network is not limited to FIG. 32. For convenience, the data packet 1700 of FIG. 32 will be referred to as a first data packet 1700.

The first data packet 1700 includes a payload 1710 that contains data to be transmitted, and a header 1720 that contains information on the payload 1710.

The header 1720 may include information 1721 for error detection, protocol version information 1722, and length information 1723 of the payload 1710.

The payload 1710 that contains actual data to be transmitted may include MAC address information 1711 of a device, which transmits a message, protocol name information 1712, length information 1713 of the protocol name, model name information 1714 of the device that transmits a message, and length information 1715 of the device model name.

Hereinafter, a method for transmitting coordinate value information or key button related information from the multimedia device 100 to the specific external device 200 will be described with reference to FIGS. 33 and 34.

Figure 33:
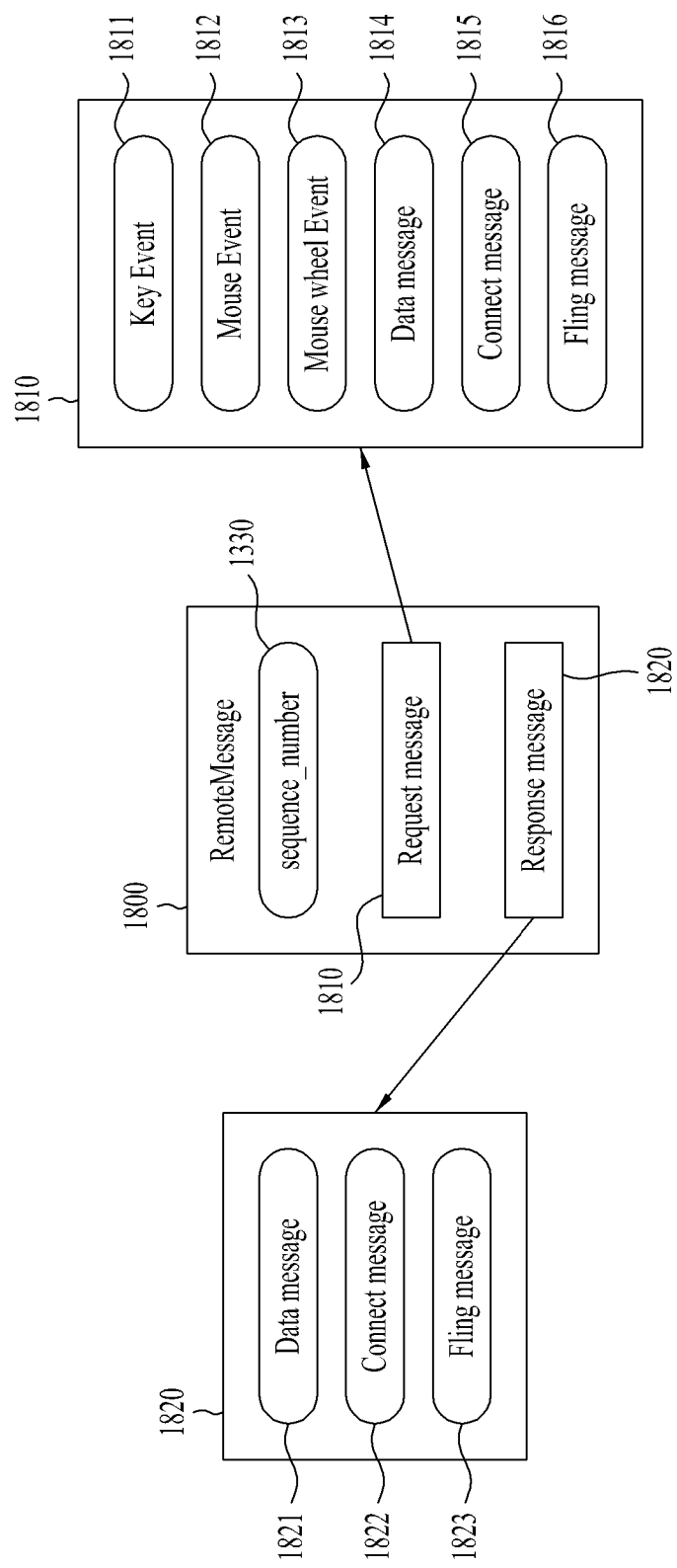
FIG. 33 is a diagram illustrating an example of a message type exchanged between a multimedia device and a specific external device after pairing between the multimedia device and the specific external device is completed.

FIG. 33 is a diagram illustrating an example of a message type exchanged between a multimedia device and a specific external device after pairing between the multimedia device and the specific external device is completed. However, it is to be understood that the message type exchanged between the multimedia device 100 and the specific external device 200 is not limited to FIG. 33.

For example, if the multimedia device 100 and the specific external device 200 transmit a message to and from each other, the message may follow a RemoteMessage protocol buffer format.

If a Request Message 1810 is included in a RemoteMessage 1800, the specific external device 200 responds to the Request message by using a Response Message 1820 of which sequence_number 1830 is the same as that of the Request message. In other words, the multimedia device 100 may provide a sequence_number 1830 field value to trace the response to the request transmitted to the specific external device 200.

The message transmitted from the multimedia device 100 to the specific external device 200 should be secreted for the Request Message 1810. The Request Message 1810 may include a key event message 1811, a mouse moving message 1812, a mouse wheel event message 1813, a message 1814 that includes data, a transmission message 1815 during connection, and a fling message 1816. The multimedia device 100 may secrete the coordinate value information and/or key button related information for the Request Message 1810 and transmit the secreted message to the specific external device 200.

The Response Message 1820 transmitted from the specific external device 200 to the multimedia device 100 may include a message 1821 that includes data, a transmission message 1822 during connection, and a fling result message 1823.

Figure 34:
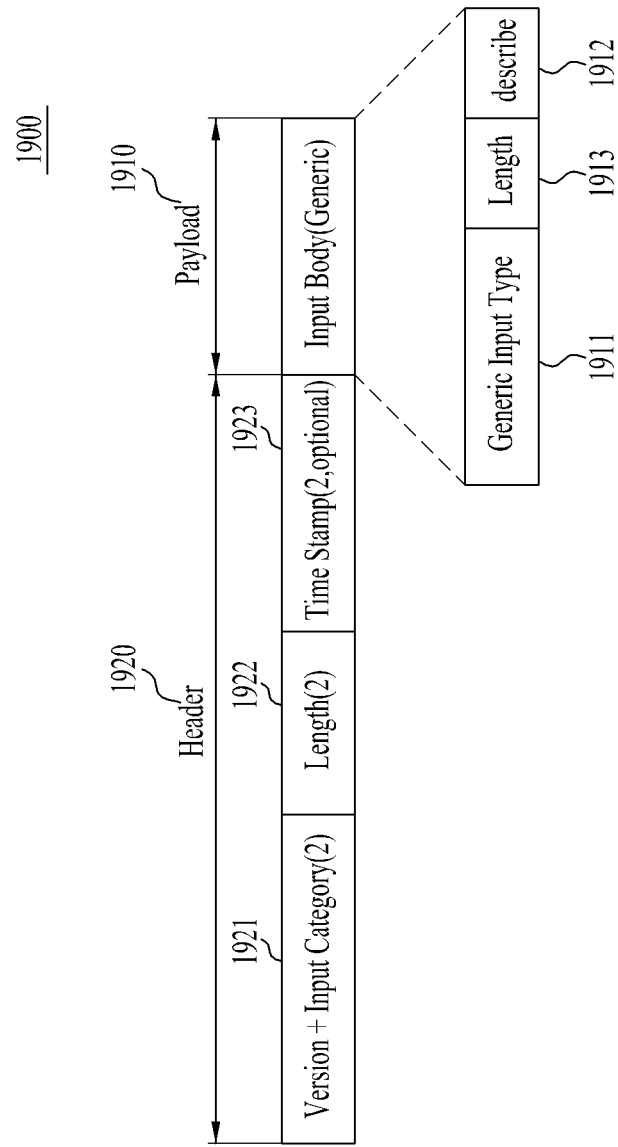
FIG. 34 is a diagram illustrating an example of a data packet transmitted from a multimedia device to a specific external device after pairing between the multimedia device and the specific external device is completed.

FIG. 34 is a diagram illustrating an example of a data packet transmitted from a multimedia device to a specific external device after pairing between the multimedia device and the specific external device is completed. However, it is to be understood that the structure of the data packet transmitted from the multimedia device to the specific external device after pairing between the multimedia device and the specific external device is completed is not limited to FIG. 34. For convenience, the data packet 1900 of FIG. 34 will be referred to as a second data packet 1900.

The second data packet 1900 includes a payload 1910 that contains data to be transmitted, and a header 1920 that contains information on the payload 1910.

The header 1920 may include protocol version information/input category information 1921, message full length information 1922, and time stamp value information 1923 of a video frame to which a content of a corresponding packet is applied.

The payload 1910 that contains actual data to be transmitted may include information 1911 on an input type of zoom, scroll, etc., coordinate value information 1912, and length information 1913 of the coordinate value.

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

The multimedia device and the method for operating the same are not limited to the aforementioned embodiments, and all or some of the aforementioned embodiments may selectively be configured in combination so that various modifications may be made in the aforementioned embodiments.

In the meantime, the method for operating the multimedia device according to the present invention may be implemented in a recording medium, which may be read by a processor provided in an electronic device, as a code that can be read by the processor. The recording medium that can be read by the processor includes all kinds of recording media in which data that can be read by the processor are stored.

Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, although the preferred embodiments of the present specification have been described, it will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A multimedia device connected with an external device, the multimedia device comprising:
    an external device interface configured to directly connect the external device with the multimedia device;
    a network interface configured to communicate with the external device through a network, wherein a communication path through the network interface is different than a communication path through the external device interface;
    a display configured to display video data and Graphic User Interface (GUI) data, which are received from the external device through the external device interface;
    a user interface configured to receive control signals from a remote controller; and
    a controller configured to:
        display, in a first area of the display, a video image based on a video signal received through the external device interface;
        display, in a second area of the display, an on screen display (OSD) to control the multimedia device;
        control the video signal displayed in the first area of the display in the external device through a first control signal transmitted to the external device; and
        control functions of the multimedia device on the OSD displayed in the second area of the display through a second control signal transmitted to the multimedia device,
        wherein the OSD displayed in the second area includes a virtual key button for controlling the functions of the multimedia device,
        the remote controller includes at least one of key button, a control signal corresponding to the key button of the remote controller being related with a specific type function corresponding the virtual key button of the OSD,
        the controller performs the specific type function of the OSD, if a control signal corresponding the key button related to the specific type function is received from the remote controller and coordinate value information calculated in accordance with a signal corresponding to motion of the remote controller corresponds to the video image displayed in the first area of the display, simultaneously, and
        the controller controls the video signal displayed in the first area of the display, if a control signal corresponding to the key button related to the specific type function is not received from the remote controller and coordinate value information calculated in accordance with a signal corresponding to motion of the remote controller corresponds to the video image displayed in the first area of the display, simultaneously.

2. The multimedia device according to claim 1, wherein the control signal output from the remote controller includes at least one of a signal corresponding to motion of the remote controller and a signal corresponding to a key button provided in the remote controller.

3. The multimedia device according to claim 1, wherein, if a user input signal for entering an external input mode of the external device is received through the user interface, the controller searches for external devices that are capable of communicating with the network interface through the network, detects an external device corresponding to the user input signal for entering the external input mode, among the searched external devices, and performs pairing with the detected external device.

4. The multimedia device according to claim 3, further comprising a memory storing a control application for the detected external device, wherein the controller accesses the control application stored in the memory and implements the accessed control application if the user input signal for entering the external input mode of the external device is received.

5. The multimedia device according to claim 3, wherein, if two or more external devices which belong to the same product group as that of the external device corresponding to the user input signal for entering the external input mode exist among the searched external devices, the controller generates a GUI for receiving a user input signal that selects any one of the two or more external devices.

6. The multimedia device according to claim 1, wherein the controller controls the network interface to transmit the control signal output from the remote controller to the external device through an IP network if the GUI data on the multimedia device is not displayed on the display.

* * * * *